United States Patent
Zhai et al.

(10) Patent No.: US 11,392,290 B2
(45) Date of Patent: Jul. 19, 2022

(54) TOUCH CONTROL SURFACES FOR ELECTRONIC USER DEVICES AND RELATED METHODS

(71) Applicant: Intel Corporation, Santa Clara, CA (US)

(72) Inventors: Tongyan Zhai, Portland, OR (US); Srikanth Potluri, Folsom, CA (US); Devon Worrell, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/914,095

(22) Filed: Jun. 26, 2020

(65) Prior Publication Data
US 2020/0326843 A1    Oct. 15, 2020

(51) Int. Cl.
*G06F 3/043*    (2006.01)
*G06F 3/04883*    (2022.01)

(52) U.S. Cl.
CPC .......... *G06F 3/04883* (2013.01); *G06F 3/043* (2013.01)

(58) Field of Classification Search
CPC ...... G06F 3/043; G06F 3/0416; G06F 3/0436; G06F 2203/04106; G06F 3/0412; G06F 3/016; G06F 3/017; G06F 3/042; G06F 3/0488; G06F 3/0418; G06F 3/044; G06F 3/041; G06F 3/045
See application file for complete search history.

(56) References Cited

U.S. PATENT DOCUMENTS

| | | | |
|---|---|---|---|
| 5,828,768 A | 10/1998 | Eatwell et al. | |
| 6,002,808 A * | 12/1999 | Freeman | G06V 40/20 348/171 |
| 6,614,422 B1 * | 9/2003 | Rafii | G06F 1/1632 345/169 |
| 2002/0075240 A1 * | 6/2002 | Lieberman | G06F 3/011 345/170 |
| 2002/0167862 A1 * | 11/2002 | Tomasi | G08B 13/19695 367/118 |
| 2003/0132950 A1 * | 7/2003 | Surucu | G06F 3/04886 715/700 |

(Continued)

FOREIGN PATENT DOCUMENTS

| | | |
|---|---|---|
| EP | 3065043 | 9/2016 |
| WO | 9531805 | 11/1995 |
| WO | 2008024988 | 2/2008 |

OTHER PUBLICATIONS

Soldado, Pedro Miguel Gato, "Toolkit for Gesture Classification Through Acoustic Sensing," Thesis submitted to Tecnico Lisboa, Nov. 2015, 78 pages.

Hughes et al., "Microphone Location by Time of Flight Triangulation," 2014, available at https://www.vialab.org/main/Publications/pdf/Hughes_BIOE_2014.pdf, 2 pages.

"Projects: 2016s1-197 Sound Triangulation for Invisible Keyboards," The University of Adelaide, https://projectswiki.eleceng.adelaide.edu.au/projects/index.php/Projects:2016s1-197_Sound_Triangulation_for_Invisible_Keyboards 1/12 (last visited May 5, 2020), 12 pages.

(Continued)

*Primary Examiner* — Olga V Merkoulova
(74) *Attorney, Agent, or Firm* — Hanley, Flight & Zimmerman, LLC

(57) ABSTRACT

Touch control surfaces for electronic user devices are disclosed herein. An example electronic device includes a microphone array, a touch event identifier to analyze signal data generated by microphones of the microphone array to detect a first touch on a surface of the electronic device, a gesture detector to correlate the first touch with a gesture, a user input mapper to map the gesture to a user input and a processor to cause the electronic device to respond to the user input.

24 Claims, 8 Drawing Sheets

(56) References Cited

U.S. PATENT DOCUMENTS

| | | | |
|---|---|---|---|
| 2006/0192763 A1* | 8/2006 | Ziemkowski | G06F 1/1632 |
| | | | 345/168 |
| 2008/0048988 A1 | 2/2008 | Qi | |
| 2011/0037734 A1 | 2/2011 | Pance et al. | |
| 2011/0084940 A1 | 4/2011 | Lee | |
| 2013/0127980 A1* | 5/2013 | Haddick | G06F 3/013 |
| | | | 348/14.08 |
| 2013/0181951 A1* | 7/2013 | Klinghult | G06F 3/043 |
| | | | 345/177 |
| 2013/0278631 A1* | 10/2013 | Border | G06Q 30/02 |
| | | | 345/633 |
| 2015/0062091 A1* | 3/2015 | Li | G06F 3/0418 |
| | | | 345/177 |
| 2015/0199025 A1* | 7/2015 | Holz | G06F 3/043 |
| | | | 345/156 |
| 2015/0277743 A1 | 10/2015 | Isherwood | |
| 2017/0083125 A1 | 3/2017 | Dow et al. | |
| 2017/0083124 A1 | 5/2017 | Dow et al. | |
| 2018/0204372 A1* | 7/2018 | Sudheendra | G06T 13/80 |

OTHER PUBLICATIONS

Linder, Courtney, "This New Tech Can Turn Any Surface Into a Touchscreen," Popular Mechanics, Dec. 26, 2019, https://www.popularmechanics.com/technology/design/a30286225/ultrasound-touchscreen-sensor/, 9 pages.

European Patent Office, "Extended European Search Report," issued in connection with European Patent Application No. 20216003.2, dated Jun. 9, 2021, 9 pages.

\* cited by examiner

TOUCH CONTROL SURFACES FOR ELECTRONIC USER DEVICES AND RELATED METHODS

FIELD OF THE DISCLOSURE

This disclosure relates generally to electronic user devices and, more particularly, to touch control surfaces for electronic user devices and related methods.

BACKGROUND

An electronic user device such as a laptop may include a touch control surface, such as a touch pad, that enables a user to provide inputs to the user device via movement of one or more of the user's fingers on the touch control surface.

BRIEF DESCRIPTION OF THE DRAWINGS

The figures are not to scale. Instead, the thickness of the layers or regions may be enlarged in the drawings. In general, the same reference numbers will be used throughout the drawing(s) and accompanying written description to refer to the same or like parts.

Figure 1:
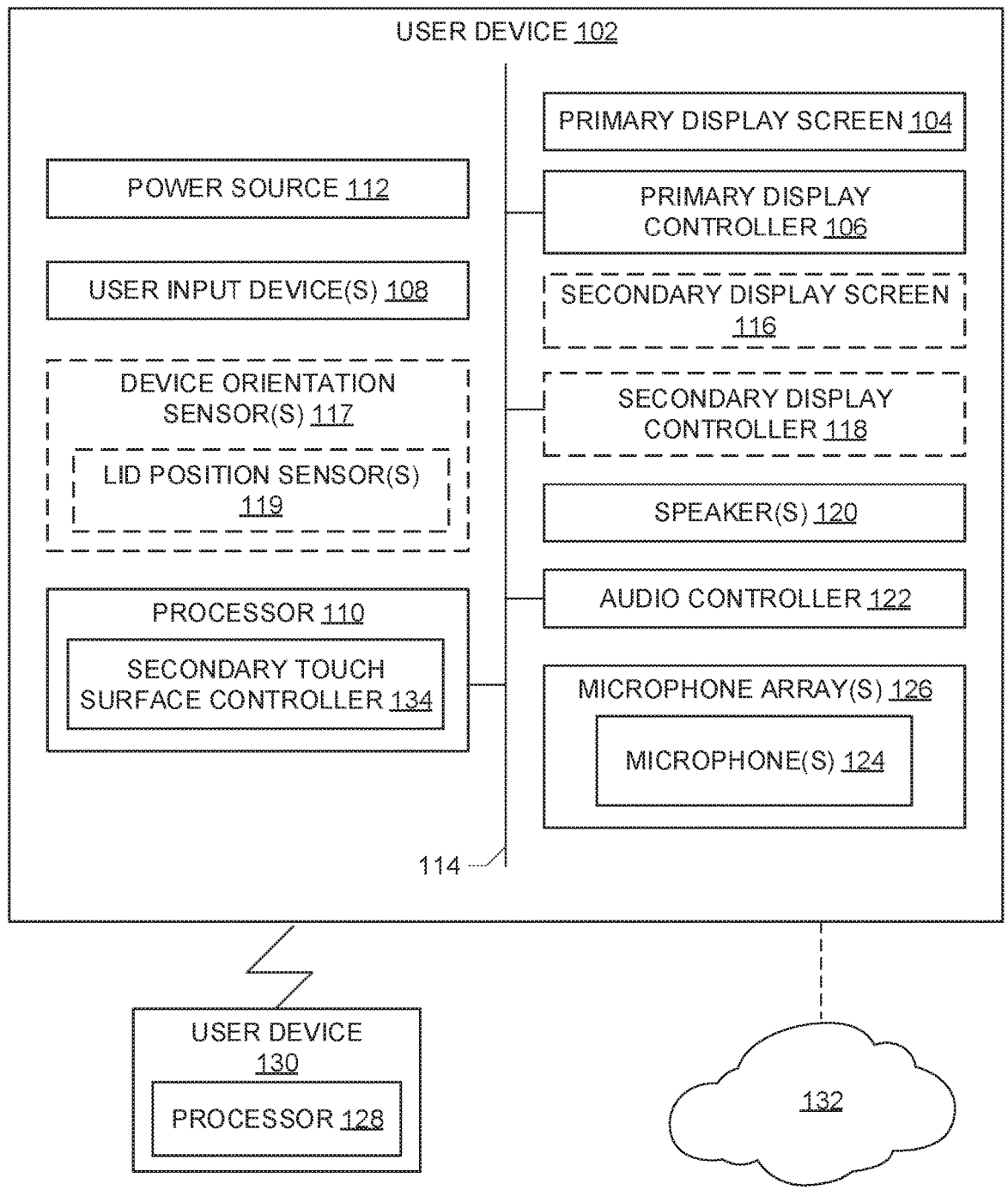
FIG. 1 illustrates an example system constructed in accordance with teachings of this disclosure and including an example user device and a secondary touch surface controller for detecting user input(s) at the device.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

An electronic user device such as a laptop may include one or more touch control surfaces, such as a touch pad and/or touch-enabled display screen, that allows a user to provide inputs to the user device via contact and/or movement of one or more of the user's fingers on the touch control surface. In a laptop, the touch pad is typically located on a base of the laptop proximate to a keyboard. The touch pad is accessible when the laptop is in an open lid mode with the display screen of the laptop spaced apart from the base. However, when the laptop is in a closed lid mode, or a mode in which the display screen is rotated toward the base and faces the keyboard, the touch pad and/or touch-enabled display screen is not accessible.

Some laptops include a secondary display screen that is viewable when the laptop is in the closed lid mode. For instance, the second display screen may be located at an edge of the laptop base. The secondary display screen can display alert(s) and/or notification(s) received at the laptop. For instance, the secondary display screen can display a notification of a new email or a notification of an incoming Internet-based phone call (e.g., a Skype® call) to alert the user of activity when the laptop is in the closed lid mode. In some instances, the secondary display screen is touch-enabled to allow the user to provide input(s) via the secondary display screen. For instance, the user can select to accept or deny an incoming phone call by touching the secondary display screen. In some examples, the user can access and/or control application(s) installed on the laptop via the secondary display screen, such as a music player, a calendar, etc.

Although a touch-enabled secondary display screen allows a user of the laptop to provide inputs when the laptop is in the closed lid mode, some secondary display screens are relatively narrow in size, as a height of the secondary display screen is less than a height of the edge of the base of the laptop that includes the secondary display screen. Thus, the user may find it difficult to navigate the secondary display screen using his or her fingers due to the size and/or location of the secondary display screen.

In other examples, a user may be operating the laptop in the open lid mode or using another an electronic user device such as a tablet. The user may be using several applications on the device at the same time such as, for instance, a music player and a word-processing application. To control the music player, the user may have to close and/or minimize the other applications (e.g., the word-processing application) to access the music player, increase the volume of the audio being played, etc. Such input(s) are typically performed via control input devices of the device such as a touch pad, touch screen, etc. However, switching between applications to access, for instance, the music player while working within the word-processing application, can be disruptive to the user.

Some known user devices include dedicated touch-sensitive (e.g., pressure-sensitive) materials to create additional touch control surface(s) on the device. However, such materials can affect the mechanical design and/or aesthetics of the device. Some known user devices provide for additional touch control surfaces on a user device by including tactile sensors that use haptic technology to recognize the location of the user's touch on the device and determine user gestures. However, such known devices require additional hardware to generate the haptic responses.

Disclosed herein are example user devices including microphone arrays that convert exterior surface(s) of a user device into touch control surface(s) to enable a user to provide input(s) at the device by touching the control surface(s). Example touch surface(s) disclosed herein can operate in addition to or as an alternative to other input device(s) associated with the device such as a touch pad, a mouse, and/or a touch screen. In examples disclosed herein, a microphone array including a plurality of (e.g., three or more) microphones is carried by, for instance, a lid of a laptop. When a user touches a surface of the lid (e.g., a surface or cover opposite the display screen), the microphones detect acoustic event(s) generated in response to the user's touch and/or finger movements on the surface of the lid. The acoustic event(s) can include audible sound generated by the user's touch on the lid surface. Additionally or alternatively, the acoustic event can be in the form of vibrational energy that propagates on the lid surface in response to the user's touch on the surface, or inaudible vibration event(s). As used herein, the term "inaudible vibration" and/or variations thereof refer to acoustic energy generated as a result of vibrations that are propagated through the surface of the device in response to the user's touch on the surface of the device.

In examples disclosed herein, the microphones generate signal data that includes the acoustic event(s) (e.g., audible sound event(s) and/or the inaudible vibration event(s)) generated as a result of touch by the user on portion(s) of the device that are acoustically coupled to the microphones. In examples disclosed herein, a portion of a surface of the user device is acoustically coupled to a microphone of the device when acoustic energy (e.g., acoustic waves) generated as a result of the user touching the portion of the surface travel within a range such that the acoustic energy can be detected by the microphone.

Examples disclosed herein analyze the signal data to identify the occurrence of touch event(s) at the user device, where the touch event(s) are represented by the acoustic event(s) in the microphone signal data. Some examples disclosed herein implement a triangulation algorithm to determine the location(s) of the user's touch on the device surface using the audible sound event(s) and/or the inaudible vibration event(s) captured in the microphone signal data. The location(s) of the user's touch on the device surface and/or changes in the location(s) of the user's touch on the device surface over time are mapped to predefined gesture(s). The gesture(s) define user interaction(s) with the electronic device, such as opening a notification displayed on a screen, accepting or dismissing an incoming Internet-based phone call, raising the volume of sound (e.g., music) output by the device, etc.

Example microphone array touch surfaces disclosed herein can be implemented at various locations of an electronic user device such as at a palm rest of a laptop, in a portion of a bezel surrounding a display screen, along a side edge of a base of an electronic tablet, etc. Example microphone array touch surface(s) disclosed herein can be defined at, for example, a lid of a laptop to allow the user to provide input(s) in response to, for instance, notification(s) displayed via a secondary display screen of the laptop when the laptop is in the closed lid mode. The lid provides a larger touch surface than the secondary display screen. Thus, in some instance, a user may prefer to provide input(s) via the microphone array touch surface on the lid rather than via the touch-enabled secondary display screen.

Some example microphone array touch surfaces enable the user to interact with the electronic device in a closed lid mode or an open lid mode. For example, a touch control surface defined by a microphone array located at a side of the lid or the base of a laptop can be accessed when the laptop is in an open lid mode or a closed lid mode. Such a control surface can be used to provide inputs to control, for example, a music player that may output music when the device is in the open lid mode or the closed lid mode.

Example microphone arrays disclosed herein can be defined by microphones that would otherwise be included in the user device for purposes of audio recording(s), capturing voice audio during Internet telephone calls, etc. Thus, unlike known devices that create touch surface(s) using extra hardware such as tactile sensor(s) and/or include materials that can affect the mechanical and/or aesthetic design of the device, examples disclosed herein do not involve the use of additional hardware and/or substantially interfere with the aesthetic design of the device.

FIG. 1 illustrates an example system 100 constructed in accordance with teachings of this disclosure for providing microphone-based touch control surface(s) at a user device 102 to enable a user to provide input(s) to control the user device (the terms "user" and "subject" are used interchangeably herein and both refer to a biological creature such as a human being). The user device 102 can be, for example, a personal computing (PC) device such as a laptop, a desktop, an electronic tablet, an all-in-one PC, a hybrid or convertible PC, etc.

The example user device 102 includes a primary display screen 104. In examples where the user device 102 is a laptop or other clamshell device, the primary display screen 104 is carried by a lid of the laptop, where the lid is moveable between an open position in which the primary display screen 104 is visible and a closed position in which the primary display screen 104 faces a keyboard of the device 102. In examples where the user device 102 is an electronic tablet, the primary display screen 104 is carried by a housing of the tablet.

A primary display controller 106 of the example user device 102 of FIG. 1 controls operation of the primary display screen 104 and facilitates rendering of content (e.g., user interfaces) via the primary display screen 104. In some examples, the primary display screen 104 is a touch screen that enables the user to interact with data presented on the primary display screen 104 by touching the screen with a stylus and/or one or more fingers of a hand of the user. Additionally or alternatively, the user can interact with data presented on the primary display screen 104 via one or more user input devices 108 of the user device 102, such as a keyboard, a mouse, a touch pad, etc. The example user device 102 includes a processor 110 that executes software to interpret and output response(s) based on the user input event(s) (e.g., touch event(s), keyboard input(s), etc.). The user device 102 of FIG. 1 includes a power source 112 such as a battery to provide power to the processor 110 and/or other components of the user device 102 communicatively coupled via a bus 114.

In some examples, the user device 102 of FIG. 1 includes a secondary display screen 116. The secondary display screen 116 can be smaller in size than the primary display screen 104 and can be positioned on the user device 102 to enable the user to view data even when the primary display screen 104 is turned off and/or is not visible to the user (e.g., because a lid of the user device 102 is closed). For example, the secondary display screen 116 can extend along an edge of a base of a laptop such that the secondary display screen 116 is visible to a user when the lid of the laptop is closed. In some examples, the secondary display screen 116 is a touch sensitive screen to enable the user to interact with content displayed via the secondary display screen 116. The example user device 102 includes a secondary display controller 118 to control operation of the secondary display screen 116 and to facilitate rendering of content (e.g., user interfaces) via the secondary display screen 116.

In some examples, the user device 102 includes device orientation sensor(s) 117 (e.g., accelerometer(s), gyrometer(s)) to generate data about an orientation of the user device 102. In examples in which the user device 102 is a clamshell device or otherwise includes a cover, the device orientation sensor(s) 117 include lid position sensor(s) 119 to determine whether the user device 102 is in an open position with the lid spaced apart from a base of the device 102 or a closed position with the lid at least partially resting on the base of the device 102. The lid position sensor(s) 119 can include, for instance, magnetic sensors that detect when respective pairs of magnetic sensors are in proximity to one another. The lid position sensor(s) 119 can include other types sensor(s) and/or switches to detect an orientation of the device 102. In some examples, display of content via the secondary display screen 116 is based on the position of the lid as detected by the lid position sensor(s) 119.

The example user device 102 includes one or more speakers 120 to provide audible outputs to a user. In some examples, the speaker(s) 120 are positioned on an exterior surface of the user device 102 (e.g., a front edge of a base of the device so that sound produced by the speakers can be heard by users regardless of whether a lid of the device is opened or closed). The example user device 102 includes an audio controller 122 to control operation of the speaker(s) 120 and facilitate rendering of audio content via the speaker(s) 120.

The example user device 102 of FIG. 1 includes a plurality of microphones 124 (e.g., three or more microphones) to detect sounds in the environment in which the user device 102 is located. The microphones 124 can include dynamic microphones, condenser microphones, digital microphones (DMICs), and/or piezo microphones (e.g., contact microphones). In the example of FIG. 1, the microphones 124 can detect frequencies in the subsonic, audible, and/or ultrasonic range (e.g., 0-40 kHZ). During operation of the user device 102, the microphones 124 can be used for, for example, near-field speech recognition. As disclosed herein, the microphones 124 serve a dual purpose in transforming surface(s) of the device 102, such as a lid of the device 102, into a touch control surface(s) to detect touch input(s) by the user.

In the example of FIG. 1, the microphones 124 define one or more microphone arrays 126. For instance, a group of three microphones 124 can define a first microphone array 126. In the example of FIG. 1, the microphones 124 defining the microphone array(s) 126 can be carried by the user device 102 at various locations. For instance, the microphone array(s) 126 can be located on a face of a lid of the device 102, on a bezel surrounding the primary display screen 104, at an edge of a base of the user device 102 (e.g., to capture sound independent of the position of the lid of the device), on a palm rest formed by a base of the user device 102 in examples where the user device 102 is a laptop, etc. The microphone array(s) 126 can be disposed at other locations on the user device 102 than those illustrated herein.

In examples disclosed herein, the microphones 124 of the microphone array 126 capture acoustic event(s) that occur in response to the user touching portion(s) of exterior surface(s) of the device 102 that are acoustically coupled to the microphones 124 of the array 126. As used herein, a portion of an exterior surface of the device 102 is acoustically coupled to a microphones 124 when acoustic energy (e.g., acoustic waves) generated as a result of contact between the user (e.g., the user's finger(s)) and the portion of the device surface travel within a range such that the acoustic energy is detectable by the microphones 124. Thus, in some examples disclosed herein, a location of a user's touch on, for example, a lid cover of the device 102, can be spaced apart from the location(s) of the microphones 124 of the array 126. However, acoustic energy generated in response to the touch can be detected by the microphones 124 despite the touch occurring some distance from the microphones 124. The exterior surface(s) of the device 102 can be defined by housing(s) of the device 102 and/or portion(s) thereof, such as a base and/or a lid, a cover, a display screen bezel, etc.

In the example system 100, the acoustic event(s) generated in response to the user's engagement with the surface of the device 102 are captured and output by each of the microphones 124 of the microphone array 126 in the form of signal data. In examples disclosed herein, the acoustic event(s) captured in the microphone signal data are used to detect touch event(s), or occurrence(s) of touch by the user on portion(s) of a surface of the user device 102 (e.g., the lid, a palm rest) that are acoustically coupled to the microphones 124 of the array 126. The acoustic event(s) captured in the microphone signal data can include audible sound event(s) and/or inaudible vibration event(s) (e.g., acoustic events(s) associated with propagation of vibrations on the surface of the device generated by the user's touch on the surface). In examples disclosed herein, the acoustic event(s) in the signal data (e.g., the audible sound event(s) and/or the inaudible vibration event(s)) serve as proxies for or representations of touch event(s) by the user on surface(s) of the device 102.

As disclosed herein, the data generated by each of the microphones 124 of the microphone array 126 is used to locate or position the user touch event(s) relative to the surface(s) of the device 102 that are acoustically coupled to the microphones 124. In FIG. 1, the location(s) of the touch event(s) and/or changes in locations of touch events over time relative to the device surface(s) are used to recognize gesture(s) performed by the user on the device surface(s) that represent user input(s). Thus, the example microphone array(s) 126 of FIG. 1 transform surface(s) of the device 102, such as a lid cover, into touch control surface(s) that enable the user to provide touch input(s) via the surface(s) to control the user device 102. In FIG. 1, the touch surface(s) provided by the microphone array(s) 126 provide alternative means for receiving a user input at the device 102 to the other user input device(s) 108 (e.g., a touch pad, a touch screen) of the device 102.

The example system 100 of FIG. 1 includes one or more semiconductor-based processors to process sensor (e.g., audio signal) data generated by the microphones 124. For example, the microphones 124 can transmit data to the on-board processor 110 of the user device 102. In other examples, the microphones 124 can transmit data to a processor 128 of another user device 130, such as a smartphone. In other examples, the microphones 124 can transmit data to a cloud-based device 132 (e.g., one or more server(s), processor(s), and/or virtual machine(s)).

In some examples, the processor 110 of the user device 102 is communicatively coupled to one or more other processors. In such examples, the microphones 124 can transmit the sensor data to the on-board processor 110 of the user device 102. The on-board processor 110 of the user device 102 can then transmit the sensor data to the processor 128 of the user device 130 and/or the cloud-based device(s) 132. In some such examples, the user device 102 (e.g., the microphones 124 and/or the on-board processor 110) and the processor(s) 128, 132 are communicatively coupled via one or more wired connections (e.g., a cable) or wireless connections (e.g., cellular, Wi-Fi, or Bluetooth connections). In other examples, the sensor data may only be processed by the on-board processor 110 (i.e., not sent off the device).

In the example system 100 of FIG. 1, the signal data generated by the microphones 124 of a respective microphone array 126 is processed by a secondary touch surface controller 134 to identify user input(s) corresponding to touch event(s) identified in the signal data. The secondary touch surface controller 134 transmits instructions that identify the user input(s) to components of the user device 102 (e.g., the audio controller 122) to cause the hardware and/or software of the user device 102 to respond to the user input(s). In the example of FIG. 1, the secondary touch surface controller 134 is implemented by executable instructions executed on the processor 110 of the user device 102. However, in other examples, the secondary touch surface controller 134 is implemented by instructions executed on the processor 128 of the wearable or non-wearable user device 130 and/or the cloud-based device(s) 132. In other examples, the secondary touch surface controller 134 is implemented by dedicated circuitry located on one or more of the user device 102 and/or the user device 130. In some examples, one or more components of the example secondary touch surface controller 134 are implemented by the on-board processor 110 of the user device 102 and one or more other components are implemented by the processor 128 of the user device 130 and/or the cloud-based device(s) 132. These components may be implemented in software, firmware, hardware, or in combination of two or more of software, firmware, and hardware.

In the example system 100 of FIG. 1, the secondary touch surface controller 134 serves to process the signal data generated by the microphones 124 of the microphone array 126 to identify user interaction(s) (i.e., touch events) relative to the surface of the device 102. As disclosed above, the acoustic energy generated in response to the user's touch can include audible sound and/or inaudible vibration event(s) generated by the propagation of vibrations at the surface of the device 102 in response to the contact between the user and the device surface. The microphones 124 capture the audible sound event(s) and/or inaudible vibration event(s) in the form of signal data. The secondary touch surface controller 134 receives and processes the signal data generated by the microphones 124. In some examples, the secondary touch surface controller 134 receives the signal data from each of the microphones 124 in substantially real-time (as used herein "substantially real time" refers to occurrence in a near instantaneous manner recognizing there may be real world delays for computing time, transmission, etc.). In other examples, the secondary touch surface controller 134 receives the signal data at a later time (e.g., periodically and/or aperiodically based on one or more settings but sometime after the activity that caused the signal data to be generated, such as a user touching an acoustically coupled surface of the device 102, has occurred (e.g., seconds later)). The secondary touch surface controller 134 can perform one or more operations on the signal data generated by the respective microphones 124 such as converting the signal data from analog data to digital data, filtering the raw signal data, removing noise from the signal data, and/or analyzing the data.

The secondary touch surface controller 134 analyzes the signal data generated by each of the microphones 124 of the respective microphone array(s) 126 to detect whether the user has touched one or more portions of a surface of the device (i.e., portion(s) of the device 102 that are acoustically coupled to the microphones 124). In the example of FIG. 1, the secondary touch surface controller 134 compares the microphone signal data to frequency threshold(s) to distinguish acoustic event(s) generated by, for instance, the user's voice and detected by the microphones 124 from acoustic event(s) captured by the microphones 124 in response to the user's touch on the device surface. The frequency threshold(s) for identifying microphone data in response to the user's touch can include the subsonic, audible, and/or ultrasonic frequency ranges (e.g., 0-40 kHz). In some examples, the touch surface controller 134 adjusts a gain of the microphone signal data to facilitate detection of the touch events. The touch surface controller 134 can identify the touch event(s) based on, for instance, changes in amplitude in the signal data.

In the example of FIG. 1, the secondary touch surface controller 134 implements an audio time-of-flight triangulation algorithm (FIG. 3) to identify location(s) where the user has touched the surface of the device 102 based on differences in arrival times of acoustic energy at each microphone 124 of the microphone array 126. The secondary touch surface controller 134 of FIG. 1 recognizes user gesture(s) based on the location(s) of the user touch event(s) and/or changes in locations of two or more touch event(s) by the user on the device surface over time. The secondary touch surface controller 134 correlates the gesture(s) to predefined command(s) for controlling the user device 102.

In some examples, the secondary touch surface controller 134 tracks the location(s) of the touch event(s) over time (e.g., predefined time periods) to identify the gesture(s) performed by the user. For example, the secondary touch surface controller 134 can determine that a touch (as represented by audible sound event(s) and/or inaudible vibration event(s) in the microphone signal data) detected at one location on a surface of the user device 102 within a predefined period of time (e.g., one second, two seconds) corresponds to a single tap based on the location of the touch and an absence of other detected touches on the surface of the user device 102 in the microphone signal data within the predefined time period. As another example, the secondary touch surface controller 134 can determine that a first touch event (i.e., a first acoustic event in the signal data) and a second touch event (i.e., a second acoustic event in the signal data) have occurred substantially at the same location on the surface of the device 102 and, as such, correspond to a double tap gesture.

As another example, the secondary touch surface controller 134 of FIG. 1 uses the audio time-of-flight triangulation algorithm to determine that a first touch event (i.e., a first acoustic event in the signal data) occurred at a first location on the device surface and a second touch event (i.e., a second acoustic event in the signal data) occurred at a second location on the device different than the first location. The secondary touch surface controller 134 determines that the second touch event occurred within a threshold time of the first touch event based on the microphone signal data. Based on the different locations of the first touch event and the second touch event relative to the surface of the device 102 and the occurrence of the two touch event(s) within a time threshold, the secondary touch surface controller 134 correlates the first touch event and the second touch event with a gesture such as a finger swipe. In some examples, the secondary touch surface controller 134 determines a direction of the swipe based on the change in location of the second touch on the surface of the device 102 relative to the location of the first touch.

The example secondary touch surface controller 134 of FIG. 1 maps the gesture(s) to predefined user input(s) for controlling hardware and/or software components of the user device 102. For example, the secondary touch surface controller 134 can correlate a single tap gesture with acceptance of an incoming Internet call while a double tap corresponds to an "enter" command. As another example, the secondary touch surface controller 134 determines that a swiping or sliding gesture in a first direction corresponds to raising a volume of an audio output by the device 102; the secondary touch surface controller 134 recognizes that a swiping or sliding gesture in a second direction opposite the first direction corresponds to lowering the volume of the audio output.

In some examples, the secondary touch surface controller 134 verifies that the detected touch event (i.e., the acoustic event source) is an intended gesture-based touch by the user based on data from other sensor(s) of the user device 102. For instance, the second touch surface controller 134 can verify the touch event as an intended gesture based on data from the device orientation sensor(s) 117 indicating the orientation of the device 102 and/or data from the display controllers 106, 118 and/or the audio controller 122 indicating activity being performed by the device 102 (e.g., the output of audio). For example, if the secondary touch surface controller 134 identifies a touch event on a lid of the user device 102 as corresponding to a tap gesture, the secondary touch surface controller 134 can verify that the touch is an intended gesture based on data from the lid position sensor(s) 119 indicating that the lid of the user device is in a closed position and data from the secondary display controller 118 indicating that data is displayed via the secondary display screen 116.

The example secondary touch surface controller 134 is in communication with one or more hardware and/or software components of the device 102. The secondary touch surface controller 134 transmits instructions including the identified gesture(s) to the component(s) of the device 102 to cause the component(s) to respond to the user input(s) represented by the gesture(s) performed on the control surface(s) defined by the microphone array(s) 126.

Figure 2:
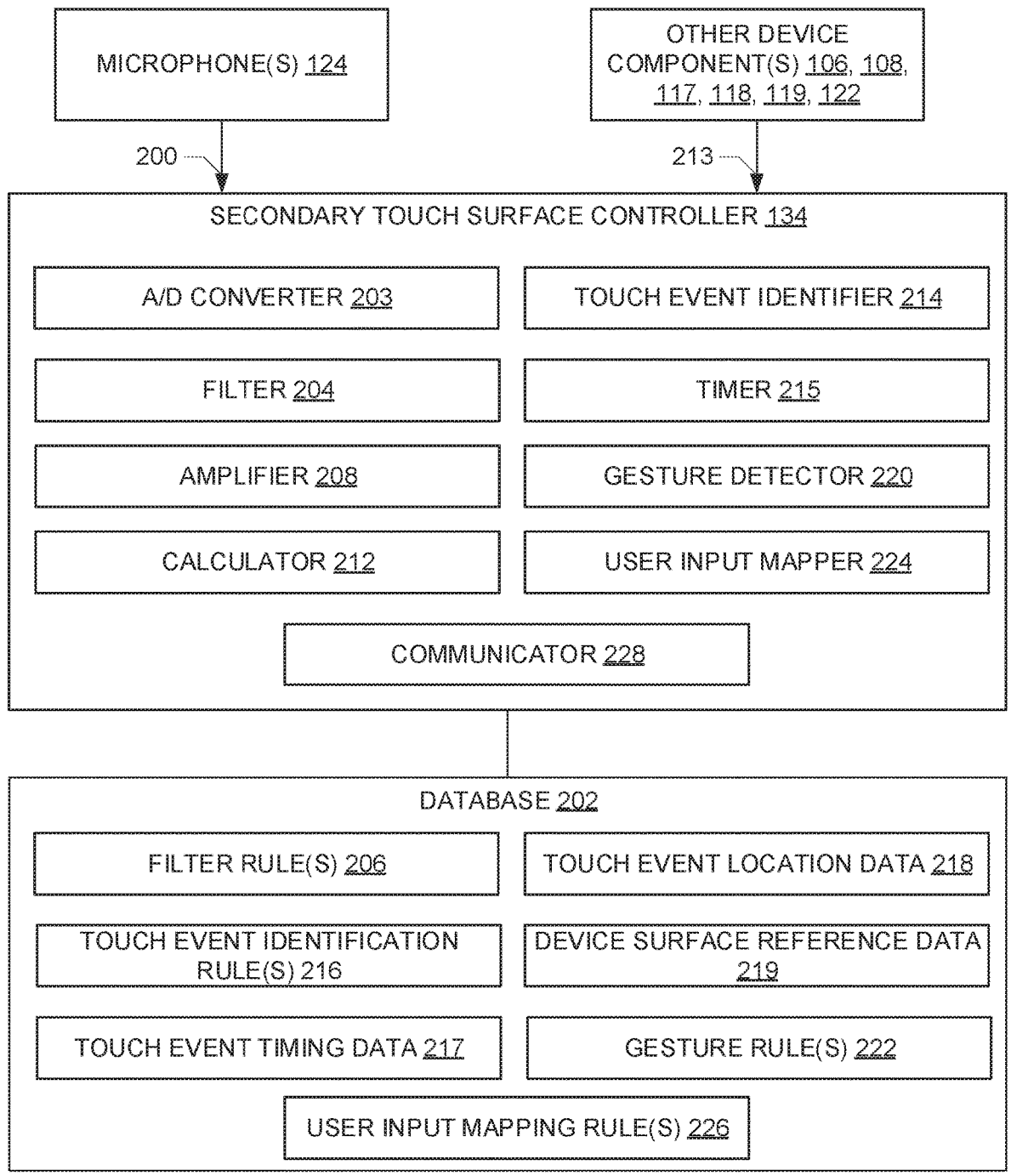
FIG. 2 is a block diagram of an example implementation of the secondary touch surface controller of FIG. 1.

FIG. 2 is block diagram of an example implementation of the secondary touch surface controller 134 of FIG. 1. As mentioned above, the secondary touch surface controller 134 is constructed to identify user interaction(s) (i.e., user touch event(s)) relative to a surface of the user device 102 (e.g., a lid, a palm rest, an edge of the device 102), recognize gesture(s) based on the interaction(s), and communicate the gesture(s) to hardware and/or software component(s) installed on the user device 102 to cause the components(s) to respond to the user inputs(s) represented by the gesture(s). In the example of FIG. 2, the secondary touch surface controller 134 is implemented by one or more of the processor 110 of the user device 102, the processor 128 of the user device 130, and/or cloud-based device(s) 132 (e.g., server(s), processor(s), and/or virtual machine(s) in the cloud 132 of FIG. 1). In some examples, some of the user interaction analysis is implemented by the secondary touch surface controller 134 via a cloud-computing environment and one or more other parts of the analysis is implemented by the processor 110 of the user device 102 being controlled and/or the processor 128 of a second user device 130 such as a smartphone.

As illustrated in FIG. 2, the example secondary touch surface controller 134 receives signal data 200 from each of the microphones 124 of the example user device 102 of FIG. 1. The signal data 200 can be stored in a database 202. In some examples, the secondary touch surface controller 134 includes the database 202. In other examples, the database 202 is located external to the secondary touch surface controller 134 in a location accessible to the secondary touch surface controller 134 as shown in FIG. 2. The signal data 200 can include frequencies in the subsonic, audible, and/or ultrasonic ranges. For example, inaudible vibration event(s) associated with the propagation of vibrations through the surface of device can be detected in the ultrasonic frequency range.

The example secondary touch surface controller 134 includes an analog-to-digital (A/D) converter 203. In the illustrated example, the A/D converter 203 provides means for sampling the raw analog microphone signal data at a particular sampling rate and converting the analog data to digital signal data for analysis by the example secondary touch surface controller 134. In other examples, the microphones 124 are digital microphone(s) that include A/D convertor(s). In such examples, the data received by the secondary touch surface controller 134 is already in digital form.

The example secondary touch surface controller 134 includes a filter 204. The filter 204 provides means for filtering the signal data received from each of the microphones 124 to remove acoustic information detected by the microphones 124 originating from source(s) other than the touch event(s). For instance, the filter 204 filters the signal data to remove frequencies associated with speech, environmental noise, etc. The filter 204 may pass frequencies within frequency band(s) know to contain most of the power for sound generated by touch on the surface of the user device 102. The frequencies passed or filtered by the filter 204 of FIG. 2 can be defined by filter rule(s) 206 stored in the database 202. The filter rule(s) 206 can include rule(s) for filtering frequencies associated, for instance, with audible sounds generated by the user's touch as compared to audible sounds associated with speech. In some examples, the filter rule(s) 206 are defined based on material properties of the user device 102 (e.g., a material type of the lid or base) that affect the propagation of vibrational energy generated in response to the user's touch on the surface of the device 102.

The example secondary touch surface controller 134 includes an amplifier 208 to adjust (e.g., increase) a gain of the filtered signal data. The adjustment to the gain of the signal data facilitates the identification of the touch event(s) by the secondary touch surface controller 134 in the microphone signal data. In some instances, a force with which the user touches the surface of the device can vary (e.g., a soft touch, a hard tap), which can affect properties of the signal data generated by each of the microphones 124 in response to the touch, such as amplitude characteristics. Increasing the gain of the signal data enables the secondary touch surface controller 134 to detect the touch event(s) whether the user touches the surface of the device lightly or with increased force.

The example secondary touch surface controller 134 includes a calculator 212. As disclosed herein, the calculator 212 analyzes the signal data generated by the respective microphones 124 in the time domain to implement an audio triangulation algorithm that identifies the location(s) of the touch event(s) on the exterior surface(s) of the device 102 based on differences in time in which the sound reached each microphone 124 of the array 126. In some examples, the calculator 212 converts the signal data generated by each of the microphones 124 from the time domain to the frequency domain (e.g., via Fourier transform). As also disclosed herein, the secondary touch surface controller 134 (e.g., the filter 204) can analyze the signal data in the frequency domain to identify, for example, acoustic information associated with speech versus touch event(s) on the device surface.

The example secondary touch surface controller 134 includes a touch event identifier 214. The touch event identifier 214 analyzes properties of the (filtered and amplified) signal data generated by each of the microphones 124 of the microphone array 126 to identify changes in the signal data indicative a touch event (i.e., indicative of an acoustic event resulting from a touch event, such as an audible sound event and/or an inaudible vibration event caused by propagation of vibrations on the surface of the device 102). The touch event identifier 214 can analyze the signal data in the frequency domain or the time domain.

For example, the touch event identifier 214 can identify amplitude change(s) in the microphone signal data received from the respective microphones 124 of the array 126 to identify acoustic event(s) (e.g., audible sound event(s) and/or inaudible vibration event(s)) in the signal data. For each signal data stream received from a microphone 124 of the array 126, the touch event identifier 214 compares amplitude change(s) in the signal data to amplitude threshold(s) defined by touch event identification rule(s) 216 to determine if the amplitude change(s) are indicative of an acoustic event that represents a touch event. The touch event identifier 214 compares the time at which the acoustic event(s) occurred in signal data from a first one of the microphones 124 to time at which the acoustic event(s) occurred in the signal data generated by the other microphones 124 of the array 126. If the touch event identifier 214 determines that (a) the amplitude change(s) in each signal data stream satisfy the amplitude threshold for an acoustic event due to a touch event and (b) the acoustic event that represents the touch event in the respective signal data from each of the microphones 124 of the array 126 occurred within a threshold time period of one another (e.g., within ten milliseconds of one another), then the touch event identifier 214 determines that a touch event has occurred on the surface of the device 102. The threshold time period(s) for comparing the occurrence of touch-related sound event(s) at each microphone 124 of the array 126 can be defined by the touch event identification rule(s) 216. The touch event identification rule(s) 216 can be defined by user input(s) and stored in the database 202.

In the example of FIG. 2, the touch event identifier 214 determines whether the signal data indicative of the touch event corresponds to an audible sound event generated by the user's touch on the exterior surface of the device 102 or to an inaudible vibration event on the surface of the device 102 caused by contact of the user's finger(s) with the device surface. The touch event identifier 214 can distinguish between the audible sound event and the inaudible vibration event based on properties of different portions of the signal data generated by the respective microphones 124 over time. For example, the frequencies at which the acoustic event(s) are detected can be compared to determine whether the acoustic event(s) originated from audible sound or inaudible vibrations. In some examples, an amplitude of a peak associated with an audible sound event may be greater than an amplitude of a peak associated with an inaudible vibration event. As another example, a number of peaks occurring within a time period and associated with an inaudible vibration event may be greater than a number of peaks occurring within the same time period for an audible sound event due to the propagation of vibrations on the device surface over time. The properties of the signal data used by the touch event identifier 214 to detect the origination of the acoustic events in the signal data can be defined by the touch event identification rule(s) 216.

In some examples, the touch event identifier 214 verifies the occurrence of a touch event based on the identification of both an audible sound event in the signal data from each of the microphones 124 in the array 126 and an inaudible vibration event in the signal data from each of the microphones 124 in the array 126. The detection of both an audible sound event and an inaudible vibration event in the microphone signal data can increase an accuracy with which the touch event identifier 214 identifies the occurrence of touch event(s) at the device 102. In other examples, the touch event identifier 212 determines the occurrence of a touch event based on the detection of an audible sound event or an inaudible vibration event alone.

In some examples, the touch event identifier 214 verifies the detection of the touch event based on data 213 from other component(s) of the user device 102, such as the device orientation sensor(s) 117, the audio controller 122, the primary and/or secondary display controller(s) 106, 118, etc. For example, the touch event identifier 214 can verify the detection of a touch event using data from each of the microphones 124 carried by a lid of the device 102 in view of data from the lid orientation sensor(s) 119 indicating that the lid is closed and data from secondary display screen controller 118 indicating that data is being presented via the secondary display screen 116. The data received from the other component(s) of the device 102 can be stored in the database 202.

The example secondary touch surface controller 134 of FIG. 2 includes a timer 215. In the example of FIG. 2, the timer 215 monitors the amount of time between, for instance, a first acoustic event in the signal data that is identified by the touch event identifier 214 as representing a first touch event and a second acoustic event that is identified by the touch event identifier 214 as representing a second touch event. The timer 215 stores touch event timing data 217 in the database 202. As disclosed herein, in some examples, the secondary touch surface controller 134 uses the touch event timing data 217 to identify gesture(s) performed by the user when touching the surface of the device 102.

In some examples, the touch event identifier 214 associates inaudible vibration event(s) in the signal data with audible sound event(s) in the signal data as arising from the same touch event based on timing between the event(s) as determined by the timer 215. For example, if the touch event identifier 214 determines that an inaudible vibration event has occurred within a threshold time of an audible sound event (e.g., based on the touch event identification rule(s) 216), the touch event identifier 214 associates the inaudible vibration event as arising from the same touch event as the audible sound event. In some examples, inaudible vibration event(s) may occur in the signal data after audible sound event(s) due to the increased time for the vibrations to propagate through the device surface.

In the example of FIG. 2, if the touch event identifier 214 determines that a touch event has occurred as represented by audible sound event(s) and/or inaudible vibration event(s) in the signal data, the secondary touch surface controller 134 uses the signal data generated by each of the microphones 124 of a microphone array 126 to determine location(s) of the audible sound event(s) and/or the inaudible vibration event(s) relative to the surface of the device 102. In examples disclosed herein, the location(s) of audible sound event(s) and/or the inaudible vibration event(s) relative to the device surface correspond to location(s) of the touch event(s), or locations on the user device 102 where the user has touched the device 102. In the example of FIG. 2, the calculator 212 executes an audio time-of-flight triangulation algorithm to identify the location of the acoustic event that was generated in response to the touch event (e.g., audible sound and/or inaudible vibrational energy that propagates through the device surface) relative to the surface of the device 102. The calculator 212 correlates the location of the acoustic event identified via triangulation with the touch event.

Figure 3:
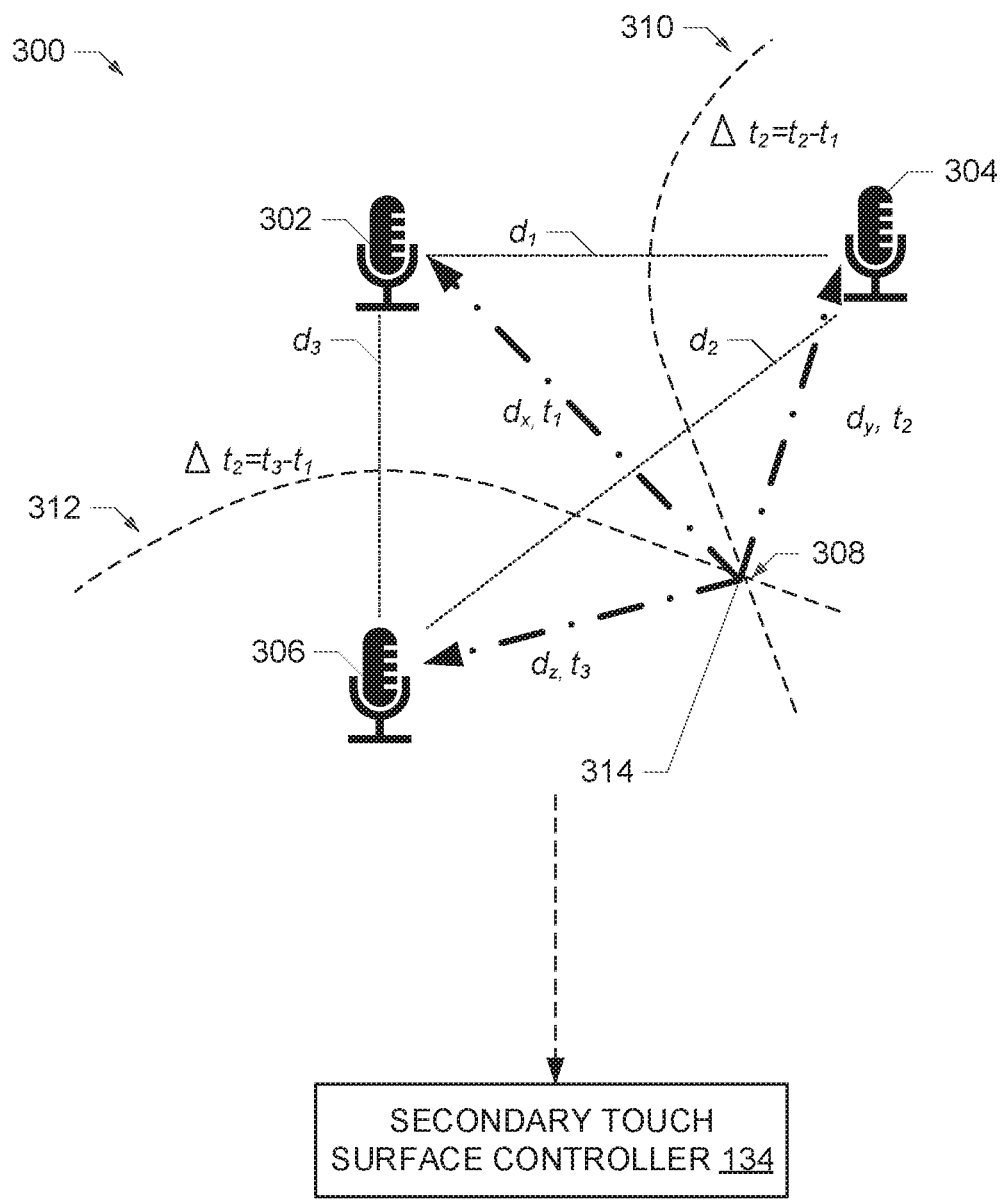
FIG. 3 is a diagram representing an example triangulation algorithm that may be executed by the example secondary touch surface controller of FIGS. 1 and/or 2 to locate user touch event(s) at the device.

FIG. 3 is a diagram representing an example audio time-of-flight triangulation algorithm that may be executed by the example secondary touch surface controller 134 of FIGS. 1 and/or 2 to identify location(s) on a surface of a user device (e.g., the user device 102 of FIG. 1) where a user touched the device and, thus, caused an acoustic event to occur. FIG. 3 illustrates an example microphone array 300 (e.g., the microphone array 126 of FIG. 1) of the device including microphones to detect sound generated in response to the user's touch proximate to the array 300. The example microphone array 300 of FIG. 3 includes a first microphone 302, a second microphone 304, and a third microphone 306 (e.g., the microphones 124 of FIG. 1). The first microphone 302 is spaced apart a first distance $d_1$ from the second microphone 304, the second microphone is spaced apart a second distance $d_2$ from the third microphone 306, and the third microphone is spaced apart a third distance $d_3$ from the first microphone 302. Thus, each microphone 302, 304, 306 is disposed at a known location relative to the other microphones 302, 304, 306.

In the example of FIG. 3, an acoustic event source 308 is generated at a location on the surface of the user device in response to the user touching the device at that location (i.e., a touch event). As disclosed herein, the acoustic event source 308 can represent an audible sound event that may occur when the user touches the device. In other examples, the acoustic event source 308 represents an inaudible vibration event in which acoustic energy (e.g., ultrasonic waves) are generated as a result of vibrations propagated on the surface of the user device in response to engagement of the user's finger(s) with the device surface. The acoustic energy (e.g., acoustic wave(s)) generated as a result of the audible sound and/or the inaudible vibrations travel and are detected by each of the microphones 302, 304, 306 of the array 300. A time for the acoustic information to arrive at each of the microphones 302, 304, 306 is a function of the speed of sound v and a distance of each microphone 302, 304, 306 from the acoustic event source 308. The acoustic energy generated as a result of the audible sound event or the inaudible vibration event is captured by the respective microphones 302, 304, 306 and output by the microphones 302, 304, 306 in the form of electrical signal data. As disclosed herein, the signal data generated by the microphones 302, 304, 306 is stored in the database 202 of FIG. 2.

In the example of FIG. 3, the acoustic event source 308 is a first unknown distance $d_x$ from the first microphone 302, a second unknown distance $d_y$ from the second microphone 304, and a third unknown distance $d_z$ from the third microphone 306. In FIG. 3, the position of the sound source 308 relative to the microphones 302, 304, 306 is determined based on differences in time of arrival of the acoustic information at the respective microphones 302, 304, 306. In FIG. 3, the acoustic wave(s) generated by the acoustic event source 308 (i.e., the user's touch) take a first time $t_1$ to arrive at the first microphone 302, a second time $t_2$ to arrive at the second microphone 304, and a third time $t_3$ to arrive at the third microphone 306. The timer 215 of the example secondary touch surface controller 134 of FIG. 2 analyzes the signal data generated by the microphones 302, 304, 306 in the time domain to determine a time at which the acoustic event indicative of the user's touch (e.g., the audible sound event or the inaudible vibration event) was captured by each microphone 302, 304, 306. As disclosed herein, the touch event identifier 214 of the example secondary touch surface controller 134 can identify the acoustic event(s) based on peaks or amplitude changes in the signal data generated by the microphone(s) 302, 304, 306 as a result of the acoustic energy emitted by the acoustic event source 308.

The calculator 212 of the secondary touch surface controller 134 executes the audio time-of-flight algorithm to determine the location of the acoustic event source 308 based on the differences in arrival times of the acoustic information at each microphone 302, 304, 306. The calculator 212 calculates a first time delay $\Delta t_1$ based on the difference in time for the acoustic energy to arrive at the first microphone 302 and the second microphone 304 (e.g., $\Delta t_1 = t_2 - t_1$). The calculator 212 calculates a second time delay $\Delta t_2$ based on the difference in time for the acoustic energy to arrive at the first microphone 302 and the third microphone 206 (e.g., $\Delta t_2 = t_3 - t_1$).

As noted above, the time of arrival of the acoustic energy at each microphone 302, 304, 306 is a function of a distance of each microphone 302, 304, 306 from the sound source 308 and the speed of sound (e.g., t=d/v). In the example of FIG. 3, the calculator 212 generates a first curve 310 based on the first time delay $\Delta t_1$. The first curve 310 represents possible distances of the acoustic event source 308 from the first microphone 302 and the second microphone 304 that would that result in the first time delay $\Delta t_1$ between the time of arrival of the acoustic energy from the acoustic event source 308 at the first microphone 302 and the second microphone 204 (e.g., $\Delta t_1 = t_2 - t_1 = d_y/v - d_x/v$). The calculator 212 generates a second curve 312 based on the second time delay $\Delta t_2$. The second curve 312 represents possible distances of the acoustic event source 308 from the first microphone 302 and the third microphone 306 that would satisfy the second time delay $\Delta t_2$ between the arrival of the acoustic energy from the acoustic event source 308 at the first microphone 302 and the second microphone 303 (e.g., $\Delta t_2 = t_3 - t_1 = d_z/v - d_x/v$). The calculator 212 of the secondary touch surface controller 134 of FIG. 2 determines the location of acoustic event source 308 (i.e., the location on the user device where the user touched the device 102) based on an intersection point 314 of the first curve 310 and the second curve 312. Thus, in the example of FIG. 3, the location of the acoustic event source 308 can be identified by the secondary touch surface controller 134 via triangulation based on the differences in time of arrival of the sound at the respective microphones 302, 304, 306.

Returning to FIG. 2, the calculator 212 of the secondary touch surface controller 134 analyzes the signal data generated by the microphones 124 using the audio time-of-flight triangulation algorithm disclosed in connection with FIG. 3 to determine the location(s) that the audible sound event(s) and/or the inaudible vibration event(s) originating from the user's touch on the device surface. In the example of FIG.

2, the location(s) of the audible sound event(s) and/or the inaudible vibration event(s) correspond to the location(s) of the touch event(s) on the device surface, or locations on the user device 102 where the user has touched the device 102.

As disclosed above, the touch event identifier 214 can distinguish between audible sound event(s) in the microphone signal data and inaudible vibration event(s) in the signal data based on properties of the signal data. The calculator 212 implements the example audio time-of-flight algorithm of FIG. 3 for portion(s) of the microphone signal data including audible sound event(s) to determine the location(s) of the user's touch on the surface of the device 102 that generated the audible sound. Additionally or alternatively, the calculator 212 implements the sound time-of-flight algorithm of FIG. 3 for portion(s) of the microphone signal data associated with inaudible vibration event(s) to determine the location(s) of the user's touch on the surface of the device 102 that resulted in the propagation of vibrations through the surface of the device 102.

The calculator 212 of FIG. 2 maps or positions the location(s) of the touch event(s) (i.e., corresponding to the location(s) of the audible sound event(s) and/or the inaudible vibration event(s)) relative to the device surface using device surface reference data 219 stored in the database 202. The device surface reference data 219 can include, for example, representation(s) of the area of the device surface that is acoustically coupled to the microphones 12 (e.g., a coordinate-based representation of the lid). The calculator 212 uses the device surface reference data 219 to orient or place the location of a touch event (e.g., as determined using the triangulation algorithm of FIG. 3) relative to the surface of the device. The calculator 212 stores the location(s) of the touch event(s) relative to the device surface as touch event location data 218 in the database 202.

As disclosed herein, the calculator 212 implements the time-of-flight algorithm of FIG. 3 for an audible sound event and for an inaudible vibration event, respectively. As also disclosed herein, the touch event identifier can associate an audible sound event and an inaudible vibration event as arising from the same touch event based on timing between the events. In such examples, the calculator 212 uses the location of the touch event identified using the time-of-flight algorithm for the portion(s) of the signal data including the audible sound event and the location of the touch event identified using the time-of-flight algorithm for the portion(s) of the signal data including the inaudible vibration event to determine the location of the user's touch with increased accuracy. The calculator 212 can determine the location of the touch event on the surface of the device 102 using location data from each implementation of the time-of-flight algorithm. For instance, the calculator 212 can select a midpoint between the locations or combine the locations determined from each implementation of the time-of-flight algorithm to locate the user's touch on the surface of the device. The location(s) of the touch event(s) as determined based on the audible sound event(s) and the inaudible vibration event(s) are stored as the touch event location data 218 in the database 202.

In some examples, the user device 102 includes multiple microphone array(s) 126 (e.g., defined by groups of three or more microphones 124). In some examples, the multiple microphone array(s) can be disposed on a surface of the device such as a lid, such as a first microphone array and a second microphone array. In such examples, microphones of each array may detect the same touch event. The calculator 212 can implement the triangulation algorithm of FIG. 3 to determine the location of the touch event using signal data generated by the respective microphones 124 of each of the first microphone array as disclosed above. Similarly, the calculator 212 can implement the triangulation algorithm of FIG. 3 to determine the location of the touch event using signal data generated by the respective microphones 124 of the second microphone array as disclosed above. The calculator 212 can verify and/or determine the location of the touch event using the touch event location data determined from the signal data generated by both the first and second microphone arrays (e.g., combining the location(s), selecting a midpoint between the identified location(s), etc.).

In the example of FIG. 2, the touch event identifier 214 identifies touch event(s) in the signal data 200 received from each of the microphones 124 over time (e.g., as represented by audible sound event(s) and/or inaudible vibration event(s)). For each touch event identified by the touch event identifier 214, the calculator 212 executes the sound time-of-flight algorithm to determine the location(s) of the touch event(s).

The example secondary touch surface controller 134 of FIG. 2 includes a gesture detector 220. The gesture detector 220 of FIG. 2 provides means for detecting gesture(s) performed by the user based on the location(s) of the touch event(s) relative to the surface of the device 102 and/or changes in the location(s) of the touch event(s) (e.g., within a predefined time period). The gesture detector 220 uses the touch event timing data 217 and the touch event location data 218 stored in the database 202 to recognize gesture(s) performed by the user on the surface of the device 102. In particular, the gesture detector 220 maps the touch event(s) to known gesture(s) based on the location data and, in some instances, the timing data for two or more touch events. The known gesture(s) are defined by gesture rule(s) 222 stored in the database 202. The gesture rule(s) 222 can be defined by user input(s).

For example, the calculator 212 may identify a touch event as occurring on the lid of the device 102. The timing data generated by the timer 215 may indicated that no additional touch event(s) were detected by the touch event identifier 214 within, for instance, two seconds of the touch event. Based on the location data, the timing data, and the gesture rule(s) 222, the gesture detector 220 can determine that the touch event corresponds to a tap.

As another example, the calculator 212 may identify a first touch event at a first location on the lid of the device 102 and a second touch event at a second location on the lid of the device 102. In this example, the gesture detector 220 determines that the first location and the second location are substantially the same location based on, for example, the proximity between the first location and the second location (e.g., based on the device surface reference data 219). The timing data 217 indicates that the second touch event occurred within one second of the first touch event. In this example, the gesture detector 220 determines that the first touch event corresponds to a first tap and the second touch event corresponds to a second tap. Based on the location data 218, the timing data 217, and the gesture rule(s) 222, the gesture detector 220 recognizes that the user has performed a double-tap gesture.

As another example, the calculator 212 may identify a first touch event at a first location on the lid of the device 102 and a second touch event at a second location on the lid of the device 102. The first location is located a first distance from the an edge of the lid and the second location is located a second distance from the edge of the lid, the second distance greater than the first distance (e.g., based on the device surface reference data 219). The timing data 217 indicates that the second touch event occurred within two seconds of the first touch event. In this example, the gesture detector 220 recognizes that the user has performed a swiping motion in a first direction based on the location data 218 indicating the different locations of the touch events, the timing data 217, and the gesture rule(s) 222.

Conversely, the calculator 212 may identify a first touch event at a first location on the lid of the device 102 and a second touch event at a second location on the lid of the device 102, where the first location is located a first distance from the an edge of the lid and the second location is located a second distance from the edge of the lid, the second distance less than the first distance (e.g., based on the device surface reference data 219). The timing data 217 indicates that the second touch event occurred within two seconds of the first touch event. Based on the location data 218, the timing data 217, and the gesture rule(s) 222, the gesture detector 220 recognizes that the user has performed a swiping motion in a second direction opposite the first direction discussed in the preceding paragraph.

The gesture detector 220 can detect other gesture(s) than the above-mentioned examples. If the gesture detector 220 does not recognize a touch event or series of touch event(s) as corresponding to a known gesture based on the gesture rule(s) 222, the touch event location data 217, and/or the touch event timing data 217, the gesture detector 220 refrains from associating the touch event(s) with gesture(s) to prevent unintended input(s) from being provided to the device 102.

The example secondary touch surface controller 134 of FIG. 2 includes a user input mapper 224. The user input mapper 224 maps the gesture(s) detected by the gesture detector 220 to user input(s) (e.g., command(s)) for the device 102. The user input mapper 224 maps or correlates the gesture(s) with user input(s) based on user input mapping rule(s) 226 stored in the database 202. The user input mapping rule(s) 226 can be defined by user input(s).

For example, the user input mapper 224 may map the single-tap gesture to an "answer an incoming call" command and a double-tap gesture to an "enter" command. As another example, the user input mapper 224 can map the swipe gesture that is performed in the first direction to a command to an "increase volume" command. The user input mapper 224 can map the swipe gesture that is performed in the first direction to a command to a "decrease volume" command. The user input mapper 224 can correlate gesture(s) with other user input(s) than the examples illustrated herein based on the user mapping rule(s) 226.

The example secondary touch surface controller 134 includes a communicator 228. The communicator 228 transmits instructions including the user input(s) identified by the user input mapper 224 to other components of the user device 102 (e.g., a display controller, and audio controller) to cause hardware and/or software of the user device 102 to take action(s) in response to the user input(s).

In some examples, the component(s) of the user device 102 respond to the command(s) during operation of the component(s) without the user directly selecting, for instance, a particular user application to receive the input(s). For example, a single tap gesture may be assigned to a "pause" command for a music application. If the music application is causing the output of music via the audio controller 122, and the communicator 228 transmits instructions indicating that the user has provided the "pause" input at the device (i.e., by performing a single tap gesture on a microphone-enabled touch control surface of the device 102), the music application may automatically respond to the "pause" command without the user selecting the music application, switching from another application to access the music application, etc.

FIGS. 4-7 illustrates user devices in which example microphone-defined touch control surfaces disclosed herein may be implemented. Although the user devices in FIGS. 4-7 include laptops, other types of user devices, such as electronic tablets, can be used to implement the example microphone-defined touch control surfaces disclosed herein on exterior surface(s) defined by housing(s) of the device or portion(s) thereof (e.g., a lid, a base, a display screen bezel). Additionally, any of the example microphone-defined touch control surfaces shown in the respective user device of FIGS. 4-7 could be included in one or more of the user devices of FIGS. 4-7 to provide multiple microphone-defined touch control surfaces at a device.

Figure 4:
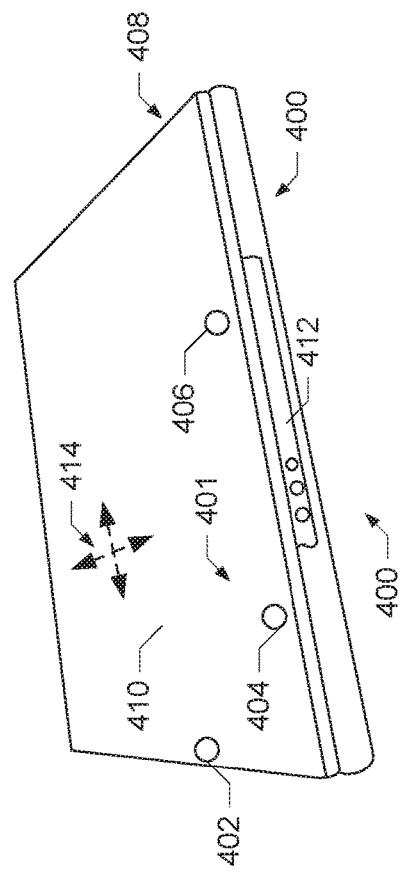
FIGS. 4-8 illustrate example user devices constructed in accordance with teachings of this disclosure.

FIG. 4 illustrates an example user device 400 including a microphone array 401 in accordance with teachings of this disclosure. The microphone array 401 is defined by a first microphone 402, a second microphone 404, and a third microphone 406 (e.g., the microphones 124 of FIG. 1). The microphone array 401 can include additional microphones than shown in the example of FIG. 4. In the example of FIG. 4, the microphones 402, 404, 406 are carried by a lid 408 of the device 400. Acoustic event(s) (e.g., audible sound and/or inaudible vibrations) generated in response to the user's touch on an exterior surface 410 defined by the lid 408 are transmitted to the microphones 402, 404, 406. Thus, the surface 410 of the lid 408 is acoustically coupled to the microphones 402, 404, 406. As such, the microphones 402, 404, 406 enable the surface 410 of the lid 408 to serve as a touch surface for receiving user touch input(s).

A user of the device 400 can touch and/or move his or her fingers in one or more directions on the surface 410 of the lid 408 (e.g., a lid cover) to perform gestures corresponding to input(s) at the device 400, as represented by arrows 414. As disclosed herein, the microphones 402, 404, 406 detect acoustic event(s) generated in response to contact between the user and the surface 410 of the lid 408. The acoustic event(s) can include audible sound or inaudible vibrations that propagate through the surface 410 of the lid 408 in response to the user's touch.

The position and/or spacing of the microphones 402, 404, 406 relative to each other and/or the surface 410 of the lid 408 can differ from the examples shown in FIG. 4. In some examples, the spacing of the microphones 402, 404, 406 is selected to enable the microphones 402, 404, 406 to detect, for instance, low frequencies associated with the touch event(s) while minimizing the effects of aliasing of the microphone signal data. Aliasing can interfere with the ability of the secondary touch controller 134 of FIGS. 1 and/or 2 to accurately identify the location of the touch event.

The user device 401 of FIG. 4 includes a secondary display screen 412. As shown in FIG. 4, the touch surface 410 enabled by the microphone array 401 is accessible when the device 400 is in a closed or clamshell configuration. Thus, the touch surface 410 can be used to respond to, for example, notifications displayed on the secondary display screen 412 when the device 401 is in the closed configuration.

Figure 5:
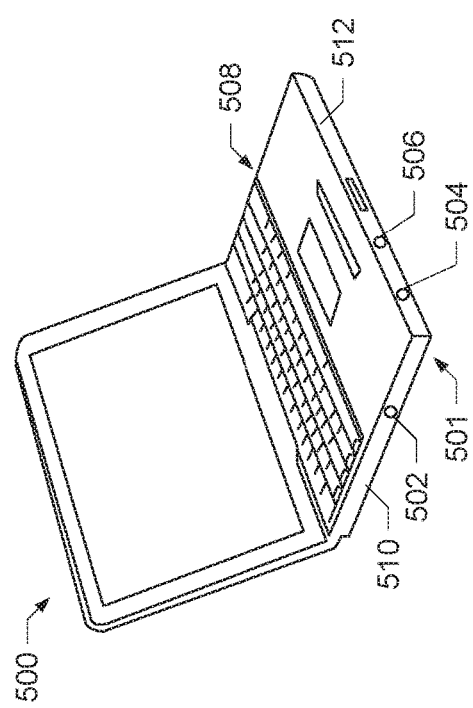

FIG. 5 illustrates an example user device 500 including a microphone array 501 in accordance with teachings of this disclosure. The microphone array of FIG. 5 includes a first microphone 502, a second microphone 504, and a third microphone 506 (e.g., the microphones 124 of FIG. 1). The microphone array 501 of FIG. 5 can include additional microphones. In the example of FIG. 5, the microphones 502, 504, 506 are carried by a base 508 of the device 500. In particular, the microphones 502, 504, 506 are disposed along a first edge 510 and a second edge 512 of the base 508. The microphones 502, 504, 506 can be located at different positions and/or spacings relative to each other and/or the base 508 than shown in the example of FIG. 5 (e.g., to minimize the effects of aliasing).

In the example of FIG. 5, a user of the device 500 can provide input(s) by, for example, sliding his or her finger(s) along one or more of the edge(s) 510, 512. The microphones 502, 504, 506 detect acoustic event(s) generated by the user's touch and/or movement. In the example of FIG. 5, the touch surface formed at the edges 510, 512 as a result of the microphone array 501 can be accessed when the device 500 is in an open configuration, as shown in FIG. 5, or in a closed or clamshell configuration.

Figure 6:
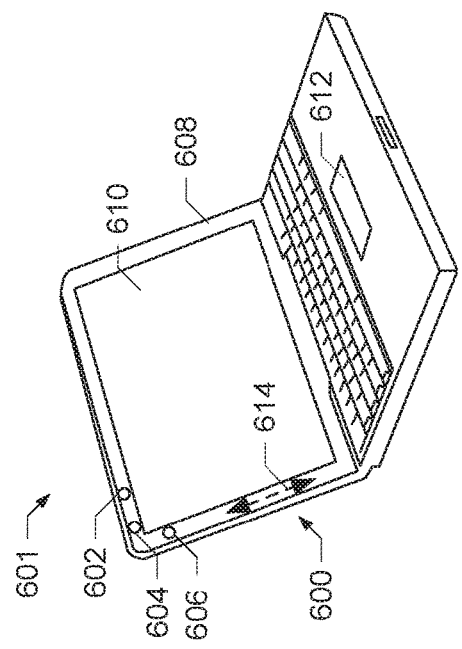

FIG. 6 illustrates another example user device 600 including a microphone array 601 in accordance with teachings of this disclosure. The microphone array 601 include a first microphone 602, a second microphone 604, and a third microphone 606 (e.g., the microphones 124 of FIG. 1). The microphone array 601 of FIG. 6 can include additional microphones. In the example of FIG. 6, the microphone array 601 is carried by a bezel 608 surrounding a primary display screen 610 of the user device 600. The microphones 602, 604, 606 can be located at different positions and/or spacings relative to each other and/or along the bezel 608.

In the example of FIG. 6, a user of the device 600 can provide input(s) by, for examples, sliding his or her finger(s) along the bezel 608 as represented by arrow 614 of FIG. 6. Acoustic event(s) (e.g., audible sound and/or inaudible vibrations propagating on the bezel 608) are detected by the microphones 602, 604, 606. In the example of FIG. 6, microphone array 601 enables the bezel 608 to act as a touch surface that can, for instance, supplement other user input devices such as a touch pad 612 of the device 600 and/or a touch-enabled display screen 610. A user can provide input(s) via the touch-surface-enabled bezel 608 during use of the device to respond to, for example, notifications displayed via the primary display screen 610.

Figure 7:
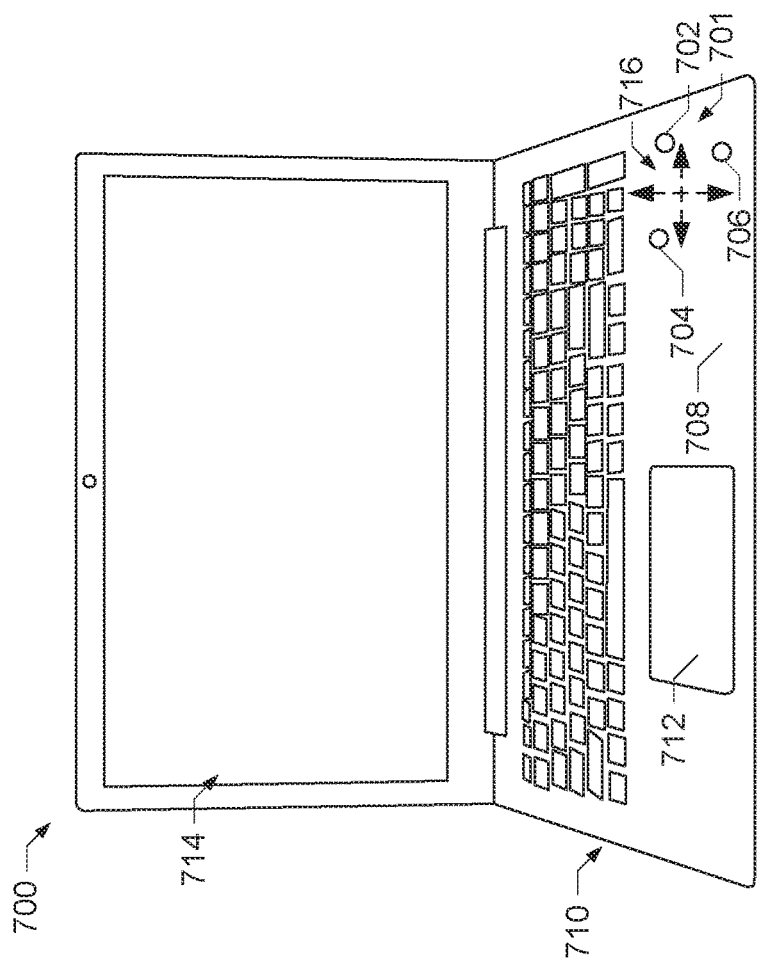

FIG. 7 illustrates another example user device 700 including a microphone array 701 in accordance with teachings of this disclosure. The microphone array 701 include a first microphone 702, a second microphone 704, and a third microphone 706 (e.g., the microphones 124 of FIG. 1). The microphone array 701 of FIG. 7 can include additional microphones. In the example of FIG. 7, the microphone array 701 is disposed on surface 708 of a base 710 of the user device 700. In the example of FIG. 7, the surface 708 defines a palm rest for a user's hand(s) as the user interacts with the device 700. The microphones 702, 704, 706 can be located at different positions and/or spacings relative to each other and/or the surface 708 of the base 710.

In the example of FIG. 7, a user of the device 700 can provide input(s) by, for examples, tapping the surface 708, swiping along the surface 708, etc. Acoustic event(s) (e.g., audible sound and/or inaudible vibrations propagating on the surface 708) are detected by the microphones 702, 704, 706 in response to the user's touch. Thus, the microphone array 701 of FIG. 7 transforms the surface 708 of the base 710 into a touch surface, thereby providing for a greater touch control area than a touch pad 712. In the example of FIG. 7, the touch-enabled surface 708 of the base 710 can supplement other user inputs devices of the device 701, such as the touch pad 712, a touch-enabled display screen 714, a mouse (not shown), etc. The arrows 716 in FIG. 7 represent example movements(s) that can be performed by the user on the surface 708 to provide input(s).

Figure 8:
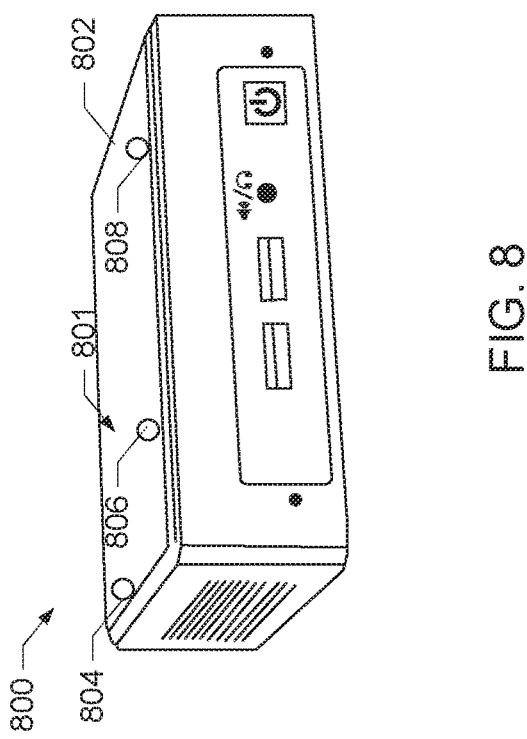

In some examples, a microphone-defined touch control surface can be defined by microphone array(s) on a peripheral device in communication with a user device. FIG. 8 illustrates a docking station 800 for a user device (e.g., the user device(s) 102, 400, 500, 600, 700 of FIGS. 1, 4-7). A surface 802 of the docking station includes a first microphone 804, a second microphone 806, and a third microphone 808 defining a microphone array 801. In the example of FIG. 8, a user touches and/or moves his or her finger(s) on the surface 802. Acoustic event(s) (e.g., audible sound and/or inaudible vibrations propagating on the surface 802) generated by the user's touch are detected by the microphones 804, 806, 808. In the example of FIG. 8, data generated by the microphones 804, 806, 808 may be transmitted from the docking station 800 to the secondary touch surface controller 134 of FIGS. 1 and/or 2 via one or more wired or wireless communication protocols for processing and analysis. Thus, example microphone-array enabled touch surfaces disclosed herein can be implemented using a variety of devices and/or form factors of exterior surfaces of the devices.

While an example manner of implementing the secondary touch surface controller 134 of FIG. 1 is illustrated in FIG. 2, one or more of the elements, processes and/or devices illustrated in FIG. 3 may be combined, divided, re-arranged, omitted, eliminated and/or implemented in any other way. Further, the example database 202, the filter 204, the amplifier 208, the converter 203, the calculator 212, the touch event identifier 214, the timer 215, the gesture detector 220, the user input mapper 224, the communicator 228 and/or, more generally, the example secondary touch surface controller 134 of FIG. 2 may be implemented by hardware, software, firmware and/or any combination of hardware, software and/or firmware. Thus, for example, any of the example database 202, the filter 204, the amplifier 208, the converter 203, the calculator 212, the touch event identifier 214, the timer 215, the gesture detector 220, the user input mapper 224, the communicator 228 and/or, more generally, the example secondary touch surface controller 134 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example database 202, the filter 204, the amplifier 208, the converter 203, the calculator 212, the touch event identifier 214, the timer 215, the gesture detector 220, the user input mapper 224, and/or the communicator 228 is/are hereby expressly defined to include a non-transitory computer readable storage device or storage disk such as a memory, a digital versatile disk (DVD), a compact disk (CD), a Blu-ray disk, etc. including the software and/or firmware. Further still, the example secondary touch surface controller 134 of FIGS. 1 and/or 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 9:
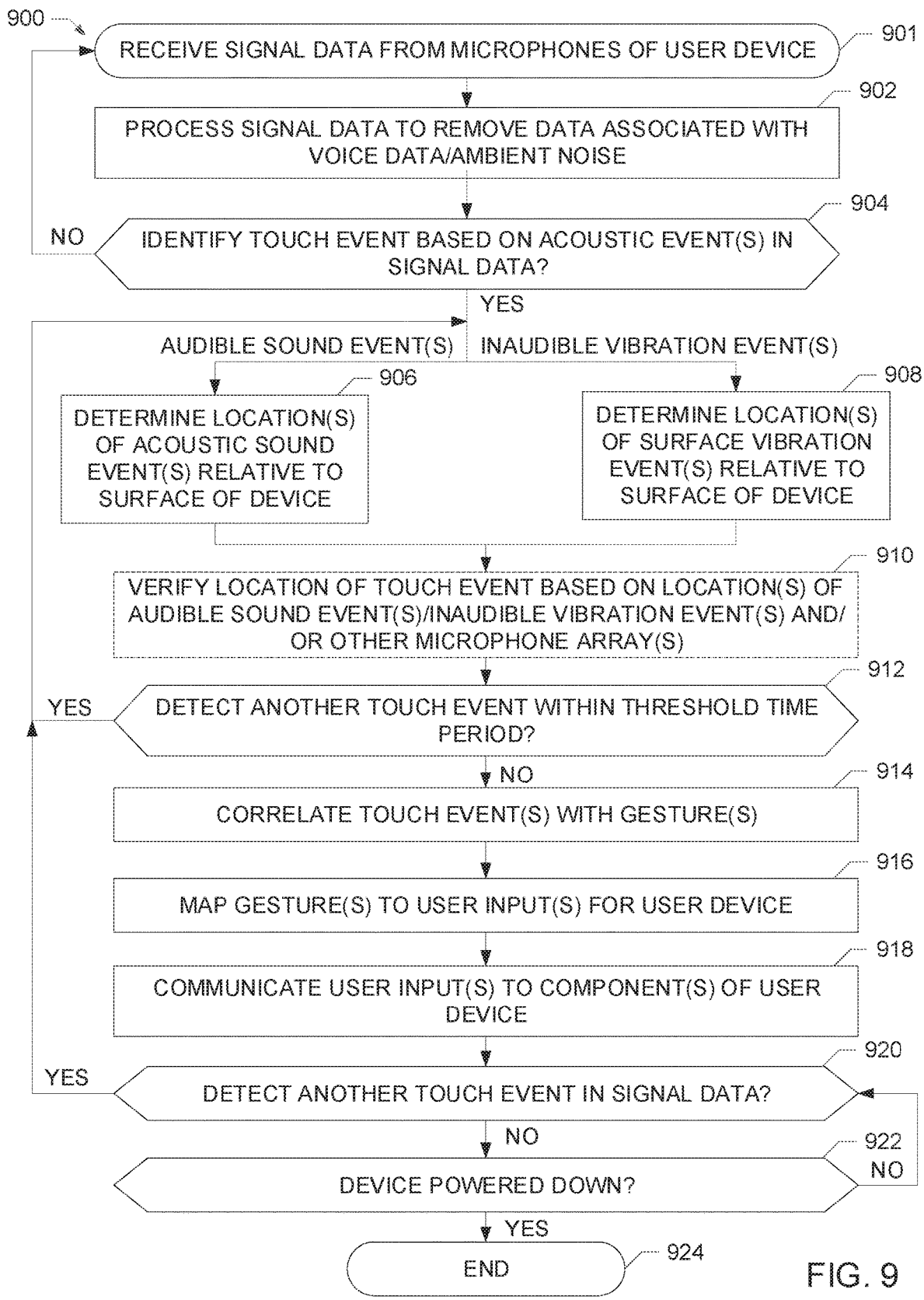
FIG. 9 is a flowchart representative of example machine readable instructions that may be executed to implement the example secondary touch surface controller of FIGS. 1 and/or 2.

A flowchart representative of example hardware logic, machine readable instructions, hardware implemented state machines, and/or any combination thereof for implementing the secondary touch surface controller 134 of FIGS. 1 and/or 2 is shown in FIG. 9. The machine readable instructions may be one or more executable programs or portion(s) of an executable program for execution by a computer processor and/or processor circuitry, such as the processor 134 shown in the example processor platform 1000 discussed below in connection with FIG. 10. The program may be embodied in software stored on a non-transitory computer readable storage medium such as a CD-ROM, a floppy disk, a hard drive, a DVD, a Blu-ray disk, or a memory associated with the processor 134, but the entire program and/or parts thereof could alternatively be executed by a device other than the processor 134 and/or embodied in firmware or dedicated hardware. Further, although the example program is described with reference to the flowchart illustrated in FIG. 9, many other methods of implementing the example secondary touch surface controller 134 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example process of FIG. 9 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 9 is a flowchart representative of example machine readable instructions 900 that, when executed, implement the example secondary touch surface controller 134 of FIGS. 1 and/or 2. The example instructions of FIG. 9 can be executed by one or more processors of, for instance, the user device 102, 400, 500, 600, 700, a second user device such as a wearable device (e.g., the user device 130), and/or a cloud-based device (e.g., the cloud-based device(s) 132. The instructions of FIG. 9 can be executed in substantially real-time as signal data is received by the secondary touch surface controller 134 or sometime after the signal data is received by the secondary touch event controller 134.

The example instructions of FIG. 9 begin with the secondary touch surface controller 134 receiving signal data 200 from each of the microphones 124, 402, 404, 406, 502, 504, 506, 602, 604, 606, 702, 704, 706, 804, 806, 808 of a microphone array 126, 401, 501, 601, 701, 801 of a user device 102, 400, 500, 600, 700, 800 (block 901). The signal data is stored in the database 202.

In the example of FIG. 9, the signal data is processed by the secondary touch surface controller 134 to remove data associated with, for example, speech and/or environmental noise captured by the microphones 124, 402, 404, 406, 502, 504, 506, 602, 604, 606, 702, 704, 706, 804, 806, 808 during operation of the user device 102, 400, 500, 600, 700, 800 (block 902). For example, the filter 204 of the of secondary touch surface controller 134 filters the signal data to remove frequencies associated with speech and/or environmental noise. The filter 204 passes frequencies within frequency band(s) know to contain most of the power for sound generated by touch on the surface of the user device 102, which may be in the subsonic, audible, or ultrasonic range.

In some examples, the secondary touch surface controller 134 performs other processing activities on the signal. For instance, the converter 203 may convert analog signal data to digital data. The amplifier 208 may amplify the signal data to increase the gain to facilitate detection of touch event(s) in the signal data. The calculator 212 can convert the signal data from the time domain to the frequency domain.

The touch event identifier 214 of FIG. 2 analyzes the filtered signal data to determine if the signal data includes evidence of a touch event, or touch on an exterior surface of the device that is acoustically coupled to the microphones 124, 402, 404, 406, 502, 504, 506, 602, 604, 606, 702, 704, 706, 804, 806, 808 of the array 126, 401, 501, 601, 701, 801 (block 904). The touch event identifier 214 analyzes properties of signal data with respect to, for example, changes in amplitude, frequencies, etc. to identify touch event(s) in the signal data. The touch event identifier 214 detects touch event(s) represented as acoustic event(s) in the microphone signal data. The acoustic event(s) can include audible sound event(s) and/or inaudible vibration event(s) (e.g., sound associated with the propagation of vibration(s) through the surface of the device in response to contact between the device surface and the user's touch). In some examples, the touch event identifier 214 verifies that the touch event is an intended gesture-based touch based on data from other sensor(s) and/or components of the device 102, such as the device orientation sensor(s) 117.

The touch event identifier 214 of FIG. 2 can distinguish between the audible sound event(s) and the inaudible vibration event(s) based on properties of the signal data, such as amplitudes, peak durations, etc. The touch event identifier 214 can associate audible sound event(s) and inaudible vibration event(s) as arising from the same touch event based on, for example, the timing between the events as monitored by the timer 215.

In the example of FIG. 9, when the touch event identifier 214 detects a touch event based on acoustic event(s) in the signal data, the calculator 212 of the secondary touch surface controller 134 determines a location of the acoustic event source corresponding to the touch event (i.e., the audible sound event(s) or the inaudible vibration event(s)). In the example of FIG. 2, the calculator 212 implements the example audio time-of-flight algorithm of FIG. 3 to determine a location of audible sound event(s) in the signal data relative to a surface of the device including the microphones 124, 402, 404, 406, 502, 504, 506, 602, 604, 606, 702, 704, 706, 804, 806, 808 (block 906). The calculator 212 determines the location of the audible sound event(s) captured by three of the microphones 124, 402, 404, 406, 502, 504, 506, 602, 604, 606, 702, 704, 706, 804, 806, 808 of a microphone array 126, 401, 501, 601, 701, 801 using the audio time-of-flight triangulation algorithm as disclosed in connection with FIG. 3 and based on the device surface reference data 219.

Additionally or alternatively, in the example of FIG. 2, the calculator 212 implements the example audio time-of-flight algorithm of FIG. 3 to determine a location of inaudible vibration event(s) in the signal data relative to the surface of the device including the microphones 124, 402, 404, 406, 502, 504, 506, 602, 604, 606, 702, 704, 706, 804, 806, 808 (block 908). The calculator 212 determines the location of the inaudible vibration event(s) captured by three of the microphones 124, 402, 404, 406, 502, 504, 506, 602, 604, 606, 702, 704, 706, 804, 806, 808 of a microphone array 126, 401, 501, 601, 701, 801 using triangulation as disclosed in connection with FIG. 3 and based on the device surface reference data 219.

In the example of FIG. 9, the location(s) of the audible sound event(s) and/or the inaudible vibration event(s) correspond to the location of the touch event on the surface of the device. In some examples, the calculator 212 verifies or determines the location of the touch event based on location data determined for the audible sound event and the location data for the inaudible vibration event to increase an accuracy with which the touch event is located relative to the surface of the device (block 910). Additionally or alternatively, in some examples, the calculator 212 verifies or determines the location of the touch event based on location data generated using signal data from two or more microphone array(s) 126.

In the example of FIG. 2, the touch event identifier 214 continues to analyze the signal data generated by the microphones 124, 402, 404, 406, 502, 504, 506, 602, 604, 606, 702, 704, 706, 804, 806, 808 to determine if additional touch event(s) have occurred within a threshold period of time as defined by the timer 215 of FIG. 2 (block 912). If additional touch event(s) are identified in the signal data (i.e., based on audible sound event(s) and/or inaudible vibration event(s)), the calculator 212 locates the touch event(s) on the surface of the device as disclosed in connection with blocks 906, 908, 910.

When no additional touch event(s) are detected within a threshold time period, the gesture detector 220 of FIG. 2 correlates the touch event(s) with gesture(s) (block 914). The gesture detector 220 maps the touch event(s) to gesture(s) using the gesture rule(s) 222, the location data 218 for the touch event(s) and/or changes in location data between two or more touch event(s), and the timing data 217 for the touch event(s) stored in the database 202. For example, the gesture detector 220 can identify a first touch event and a second touch event, where a location of the second touch event is spaced apart from a location of the first touch event as corresponding to a first gesture such as a swiping motion. The gesture detector 220 can identify a third touch event and a fourth touch event, where a location of the third touch event and a location of the fourth touch event are substantially the same as corresponding to a double tap gesture.

The user input mapper 224 of FIG. 2 maps the gesture(s) to user input(s) (block 916). The user input mapper 224 determines a corresponding user input for a gesture based on the user input mapping rule(s) 226 stored in the database 202.

The communicator 228 of FIG. 2 transmits instructions including the user input(s) to the hardware and/or software component(s) of the user device 102 to cause the component(s) of the device 102 (e.g., the audio controller 122) to respond to the input(s) (block 918).

The touch event identifier 214 continues to analyze the signal data received from each of the microphones 124, 402, 404, 406, 502, 504, 506, 602, 604, 606, 702, 704, 706, 804, 806, 808 to identify touch event(s) in the signal data (e.g., as represented by audible sound event(s) and/or inaudible vibration event(s)) (block 920). The example instructions 900 of FIG. 9 end when the user device is powered off (blocks 922, 924).

Figure 10:
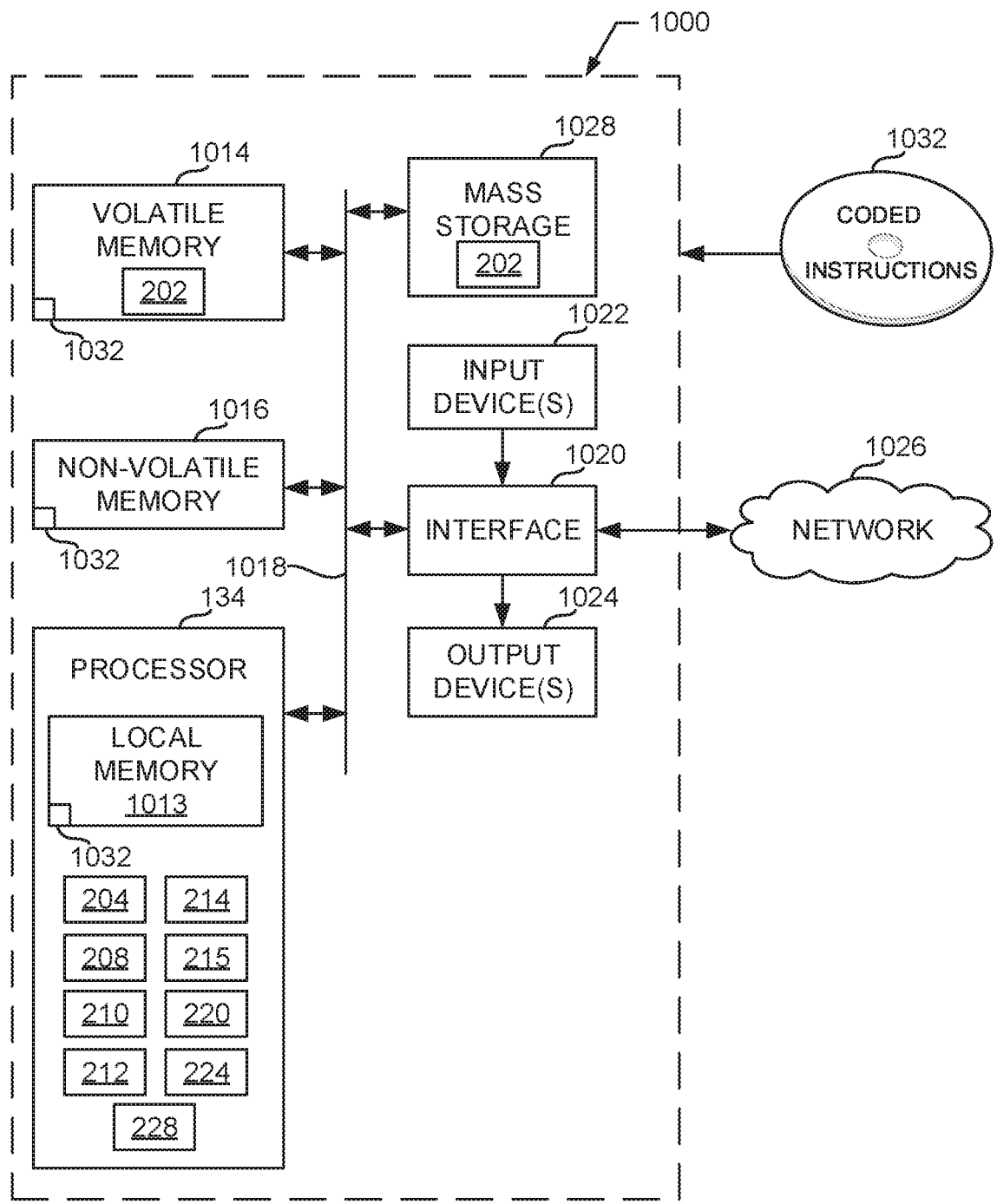
FIG. 10 is a block diagram of an example processing platform structured to execute the instructions of FIG. 9 to implement the example secondary touch surface controller of FIGS. 1 and/or 2.

FIG. 10 is a block diagram of an example processor platform 1000 structured to execute the instructions of FIG. 9 to implement the example secondary touch surface controller 134 of FIGS. 1 and/or 2. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a headset or other wearable device, or any other type of computing device.

The processor platform 1000 of the illustrated example includes a processor 134. The processor 134 of the illustrated example is hardware. For example, the processor 134 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example filter 204, the example amplifier 208, the example converter 203, the example calculator 212, the example touch event identifier 214, the example timer 215, the example gesture detector 220, the example user input mapper 224, and the example communicator 228.

The processor 134 of the illustrated example includes a local memory 1013 (e.g., a cache). The processor 134 of the illustrated example is in communication with a main memory including a volatile memory 1014 and anon-volatile memory 1016 via a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), a Bluetooth® interface, a near field communication (NFC) interface, and/or a PCI express interface.

In the illustrated example, one or more input devices 1022 are connected to the interface circuit 1020. The input device(s) 1022 permit(s) a user to enter data and/or commands into the processor 134. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1020 of the illustrated example, thus, typically includes a graphics driver card, a graphics driver chip and/or a graphics driver processor.

The interface circuit 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1026. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, redundant array of independent disks (RAID) systems, and digital versatile disk (DVD) drives.

The machine executable instructions 1032 of FIG. 9 may be stored in the mass storage device 1028, in the volatile memory 1014, in the non-volatile memory 1016, and/or on a removable non-transitory computer readable storage medium such as a CD or DVD.

Figure 11:
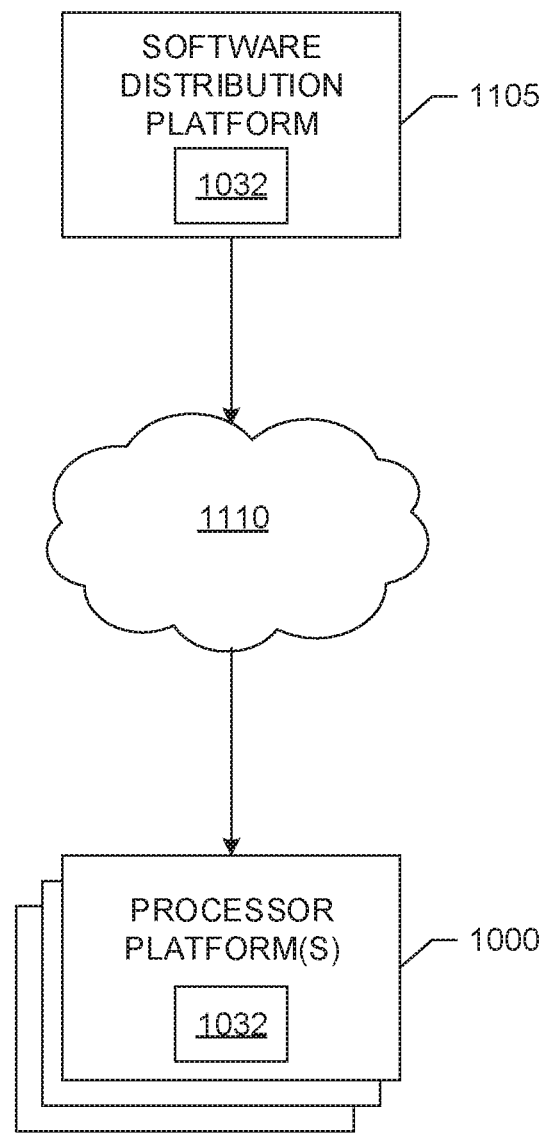
FIG. 11 is a block diagram of an example software distribution platform to distribute software (e.g., software corresponding to the example computer readable instructions of FIG. 9) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 1105 to distribute software such as the example computer readable instructions 1032 of FIG. 10 to third parties is illustrated in FIG. 11. The example software distribution platform 1105 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 1032 of FIG. 10. The third parties may be consumers, users, retailers, OEMs, etc., who purchase and/or license the software for use and/or re-sale and/or sub-licensing. In the illustrated example, the software distribution platform 1105 includes one or more servers and one or more storage devices. The storage devices store the computer readable instructions 1032, which may correspond to the example computer readable instructions 900 of FIG. 9, as described above. The one or more servers of the example software distribution platform 1105 are in communication with a network 1110, which may correspond to any one or more of the Internet and/or any of the example networks 1026 described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 1032 from the software distribution platform 1105. For example, the software, which may correspond to the example computer readable instructions 900 of FIG. 9, may be downloaded to the example processor platform 1000, which is to execute the computer readable instructions 1032 to implement the example secondary touch surface controller 134 of FIGS. 1 and/or 2. In some example, one or more servers of the software distribution platform 1105 periodically offer, transmit, and/or force updates to the software (e.g., the example computer readable instructions 1032 of FIG. 10) to ensure improvements, patches, updates, etc. are distributed and applied to the software at the end user devices.

From the foregoing, it will be appreciated that example methods, apparatus, and articles of manufacture have been disclosed that transform exterior surfaces of an electronic user device (e.g., a laptop) into touch control surface(s) using microphone arrays. Examples touch surfaces disclosed herein include microphones to capture acoustic event(s) generated as a result of contact between, for instance, a user's finger(s) and a surface of the device (e.g., a lid, a display bezel, etc.). In examples disclosed herein touch event(s) on the surface of the device can be detected in the signal data generated by the microphones. The touch event(s) can be identified based on audible noise captured by the microphones and/or inaudible vibrations that propagate on the surface of the device in response to the touch. Examples disclosed herein locate the touch event(s) on the device surface based on the acoustic event(s), correlate the touch event(s) to with gesture(s), and map the gesture(s) to user input(s) or command(s) for the device. Example microphone arrays disclosed herein enable surface(s) of the user device such as the base, lid, and/or display bezel to be transformed into touch-enabled user input surface(s) to supplement other input device(s) for the device (e.g., a touch pad). As a result, examples disclosed herein provide for enhanced user interaction with the device.

Example methods, apparatus, systems, and articles of manufacture to implement touch control surfaces for electronic user devices are disclosed herein. Further examples and combinations thereof include the following:

Example 1 includes An electronic device including a microphone array; a touch event identifier to analyze signal data generated by microphones of the microphone array to detect a touch on a surface of the electronic device; a gesture detector to correlate the touch with a gesture; a user input mapper to map the gesture to a user input; and a processor to cause the electronic device to respond to the user input.

Example 2 includes the electronic device of example 1, further including a calculator to determine a location of the touch relative to the surface of the electronic device based on the signal data, the gesture detector to correlate the touch with the gesture based on the location of the touch.

Example 3 includes the electronic device as defined in example 2, wherein the calculator is to determine the location of the touch based on an arrival time of acoustic energy generated in response to the touch at each of the microphones of the microphone array.

Example 4 includes the electronic device as defined in example 2, wherein the microphone array includes a first microphone, a second microphone, and a third microphone, the calculator to determine the location of the touch based on respective distances between the first microphone, the second microphone, and the third microphone.

Example 5 includes the electronic device as defined in any of examples 1-4, wherein the touch event identifier is to identify an acoustic event in the signal data, the acoustic event indicative of the touch.

Example 6 includes the electronic device as defined in example 5, wherein the acoustic event includes at least one of an audible sound event or an inaudible vibration event, the inaudible vibration event indicative of vibrations at the surface of the electronic device in response to the touch.

Example 7 includes the electronic device as defined in examples 1 or 2, wherein the touch includes a first touch and a second touch on the surface of the electronic device.

Example 8 includes the electronic device as defined in examples 1 or 2, wherein the touch is a first touch and the touch event identifier is to detect a second touch on the surface of the electronic device, the gesture detector to correlate the first touch and the second touch with the gesture.

Example 9 includes the electronic device as defined in example 8, further including a timer to generate timing data for a first acoustic event in the signal data and a second acoustic event in the signal data, the first acoustic event corresponding to the first touch and the second acoustic event corresponding to the second touch, the gesture detector to correlate the first touch and the second touch with the gesture based on the timing data.

Example 10 includes the electronic device as defined in example 1, wherein the signal data includes first signal data generated by a first microphone of the microphone array, second signal data generated by a second microphone of the microphone array, and third signal data generated by a third microphone of the microphone array, and wherein the touch event identifier is to detect the touch based on a first amplitude change in the first signal data, a second amplitude change in the second signal data, and third amplitude change in the third signal data, each of the first amplitude change, the second amplitude change, and the third amplitude change occurring in the respective signal data within a threshold period of time.

Example 11 includes a non-transitory computer readable medium comprising instructions that, when executed, cause a computing device to at least: detect a first touch by a user on a surface of the computing device based on microphone signal data generated by microphones of the computing device; determine a location of the first touch relative to the surface of the computing device based on the microphone signal data;

correlate the first touch with a gesture; and identify a user input based on the gesture; and cause the computing device to respond to the user input.

Example 12 includes the non-transitory computer readable medium as defined in example 11, wherein the instructions, when executed, further cause the computing device to:

detect a second touch on the surface of the computing device based on the microphone signal data; and correlate the first touch and the second touch with the gesture.

Example 13 includes the non-transitory computer readable medium as defined in example 11, wherein the instructions, when executed, further cause the computing device to verify the first touch based on sensor data generated by a device orientation sensor of the computing device.

Example 14 includes the non-transitory computer readable medium as defined in any of examples 11-13, wherein the instructions, when executed, further cause the computing device to detect the first touch based on at least one of an audible sound event or an inaudible vibration event in the microphone signal data.

Example 15 includes the non-transitory computer readable medium as defined in example 11, wherein the microphone signal data includes first signal data generated by a first microphone, second signal data generated by a second microphone, and third signal data generated by a third microphone and the instructions, when executed, further cause the computing device to determine the location of the first touch based on the first signal data, the second signal data, and the third signal data.

Example 16 includes the non-transitory computer readable medium as defined in example 15, wherein the instructions, when executed, further cause the computing device to determine the location of the first touch based on triangulation using the first signal data, the second signal data, and the third signal data.

Example 17 includes the non-transitory computer readable medium as defined in any of examples 11, 12, 13, or 15, wherein the microphone signal data includes ultrasonic frequency data, the first touch to be detected based on the ultrasonic frequency data.

Example 18 includes a computing device including a housing defining an exterior surface; a microphone array including a plurality of microphones, each of the microphones of the microphone array to generate microphone signal data; and at least one processor to: determine a location of a touch by a user on the exterior surface based on the microphone signal data; correlate the touch with a gesture based on the location; determine an input for the computing device based on the gesture; and transmit the input to a controller of the computing device to cause the controller to respond to the input.

Example 19 includes the computing device as defined in example 18, wherein the processor is to detect the location of the touch based on an arrival time of acoustic energy generated in response to the touch at each of the microphones of the microphone array.

Example 20 includes the computing device as defined in examples 18 or 19, wherein the microphone array includes a first microphone, a second microphone, and a third microphone.

Example 21 includes the computing device as defined in example 20, wherein the processor is to detect an occurrence of the touch in each of first signal data generated by the first microphone, second signal data generated by the second microphone, and third signal data generated by third microphone.

Example 22 includes the computing device as defined in example 21, further including a device orientation sensor, the processor to verify the occurrence of the touch based on data generated by the device orientation sensor.

Example 23 includes the computing device as defined in example 18, wherein the housing includes a lid, the lid defining the exterior surface, the exterior surface accessible when the lid is in a closed position relative to a base of the computing device.

Example 24 includes the computing device as defined in example 18, wherein the housing includes a base, the exterior surface defined by an edge of the base.

Example 25 includes the computing device as defined in any of examples 18-24, wherein the microphone signal data includes inaudible vibration data indicative of vibrations of the exterior surface generated in response to the touch, the processor to detect an occurrence of the touch based on the inaudible vibration data.

Example 26 includes an apparatus including a touch event identifier to analyze signal data generated by microphones of a microphone array of an electronic device to detect a touch by a user on a surface of the electronic device; a calculator to determine a location of the touch relative to the surface of the electronic device based on the signal data; a gesture detector to correlate the touch with a gesture; a user input mapper to map the gesture to a user input; and a communicator to output an instruction including the user input to cause the electronic device to respond to the user input.

Example 27 includes the apparatus as defined in example 26, wherein the touch includes a first touch and a second touch.

Example 28 includes the apparatus of example 27, further including a timer to generate timing data for a first acoustic event in the signal data and a second acoustic event in the signal data, the first acoustic event corresponding to the first touch and the second acoustic event corresponding to the second touch, the gesture detector to correlate the first touch and the second touch with the gesture based on the timing data.

Example 29 includes the apparatus as defined in examples 26 or 27, wherein the touch event identifier is to detect the touch based on an audible sound event or an inaudible vibration event in the signal data, the inaudible vibration event indicative of vibrations at the surface of the electronic device in response to the touch.

Example 30 includes the apparatus as defined in examples 26 or 27, wherein the signal data includes ultrasonic frequency data, the touch event identifier to identify the touch based on the ultrasonic frequency data.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:
1. An electronic device comprising:
a microphone array;
a touch event identifier to:
  identify an audible sound event in signal data corresponding to signals output by microphones of the microphone array;
  identify a surface vibration event in the signal data, the surface vibration event indicative of vibrations of a surface of the electronic device in a frequency range different than a frequency range associated with the audible sound event; and detect a touch on the electronic device based on the identification of the audible sound event and the surface vibration event;
a gesture detector to correlate the touch with a gesture;
a user input mapper to map the gesture to a user input; and
a processor to cause the electronic device to respond to the user input.

2. The electronic device as defined in claim 1, further including a calculator to determine a location of the touch relative to the surface of the electronic device based on the signal data, the gesture detector to correlate the touch with the gesture based on the location of the touch.

3. The electronic device as defined in claim 2, wherein the calculator is to determine the location of the touch based on an arrival time of acoustic energy generated in response to the touch at each of the microphones of the microphone array.

4. The electronic device as defined in claim 2, wherein the microphone array includes a first microphone, a second microphone, and a third microphone, the calculator to determine the location of the touch based on respective distances between the first microphone, the second microphone, and the third microphone.

5. The electronic device as defined in claim 1, wherein the touch includes a first touch and a second touch on the surface of the electronic device.

6. The electronic device as defined in claim 1, wherein the touch is a first touch and the touch event identifier is to detect a second touch on the surface of the electronic device, the gesture detector to correlate the first touch and the second touch with the gesture.

7. The electronic device as defined in claim 6, further including a timer to generate timing data for a first acoustic event in the signal data and a second acoustic event in the signal data, the first acoustic event corresponding to the first touch and the second acoustic event corresponding to the second touch, the gesture detector to correlate the first touch and the second touch with the gesture based on the timing data.

8. The electronic device of claim 1, wherein the frequency range for the surface vibration event is an ultrasonic frequency range.

9. A non-transitory computer readable medium comprising instructions that, when executed, cause a computing device to at least:
detect a first touch by a user on a surface of the computing device based on signals output by microphones of the computing device;
determine a location of a source of an audible sound event relative to the surface of the computing device based on the signals;
determine a location of a source of a surface vibration event relative to the surface of the computing device based on the signals, the surface vibration event indicative of surface vibrations of the computing device in a frequency range different than a frequency range associated with the audible sound event;
determine a location of the first touch relative to the surface of the computing device based on first location data indicative of the location of the source of the audible sound event and second location data indicative of the location of the source of the surface vibration event;
correlate the first touch with a gesture;
identify a user input based on the gesture; and
respond to the user input.

10. The non-transitory computer readable medium as defined in claim 9, wherein the instructions, when executed, further cause the computing device to:
detect a second touch on the surface of the computing device based on the signals; and
correlate the first touch and the second touch with the gesture.

11. The non-transitory computer readable medium as defined in claim 9, wherein the instructions, when executed, further cause the computing device to verify the first touch based on sensor data generated by a device orientation sensor of the computing device.

12. The non-transitory computer readable medium as defined in claim 9, wherein the instructions, when executed, cause the computing device to detect the surface vibration event based on ultrasonic frequencies in the signals.

13. A computing device comprising:
a housing defining an exterior surface;
a first microphone array including a first plurality of microphones, the microphones of the first microphone array to output first microphone signals; and
a second microphone array including a second plurality of microphones, the microphones of the second microphone array to output second microphone signals;
instructions;
at least one processor to execute the instructions to:
determine a location of a touch by a user on the exterior surface based on the first microphone signals;
verify the location of the touch based on the second microphone signals;
correlate the touch with a gesture based on the location;
determine an input for the computing device based on the gesture; and
cause a response to the input.

14. The computing device as defined in claim 13, wherein the processor is to determine the location of the touch based on an arrival time of acoustic energy generated in response to the touch at each of the microphones of the first microphone array.

15. The computing device as defined in claim 13, wherein the first microphone array includes a first microphone, a second microphone, and a third microphone.

16. The computing device as defined in claim 15, wherein the processor is to detect an occurrence of the touch in each of first signals generated by the first microphone, second signals generated by the second microphone, and third signals generated by the third microphone.

17. The computing device as defined in claim 16, further including a device orientation sensor, the processor to verify the occurrence of the touch based on data corresponding to signals output by the device orientation sensor.

18. The computing device as defined in claim 13, wherein the housing includes a lid, the lid defining the exterior surface, the exterior surface accessible when the lid is in a closed position relative to a base of the computing device.

19. The computing device as defined in claim 13, wherein the housing includes a base, the exterior surface defined by an edge of the base.

20. An apparatus comprising:
memory;
instructions; and
processor circuitry to execute the instructions to:
detect a first touch by a user on a surface of an electronic device based on signals output by microphones of a microphone array of the electronic device;

determine a location of a source of an audible sound event relative to the surface of the electronic device based on the signals;

determine a location of a source of a surface vibration event relative to the surface of the electronic device based on the signals, the surface vibration event indicative of surface vibrations of the electronic device in a frequency range different than a frequency range associated with the audible sound event;

determine a location of the first touch relative to the surface of the electronic device based on first location data indicative of the location of the source of the audible sound event and second location data indicative of the location of the source of the surface vibration event;

correlate the first touch with a gesture;

map the gesture to a user input; and cause an output of a response to the user input.

21. The apparatus as defined in claim 20, wherein the processor circuitry is to:

detect a second touch on the surface of the electronic device based on the signals; and correlate the first touch and the second touch with the gesture.

22. The apparatus as defined in claim 21, wherein the processor circuitry is to correlate the first touch and the second touch with the gesture based on timing data associated with the detection of the first touch and second timing data associated with detection of the second touch.

23. The apparatus as defined in claim 20, wherein the processor circuitry is to verify the first touch based on sensor data corresponding to signals output by a device orientation sensor of the electronic device.

24. The apparatus as defined in claim 20, wherein the processor circuitry is to detect the surface vibration event based on ultrasonic frequencies in the signals.

* * * * *